(12) United States Patent
Svendsen

(10) Patent No.: US 8,285,776 B2
(45) Date of Patent: Oct. 9, 2012

(54) SYSTEM AND METHOD FOR PROCESSING A RECEIVED MEDIA ITEM RECOMMENDATION MESSAGE COMPRISING RECOMMENDER PRESENCE INFORMATION

(75) Inventor: Hugh Svendsen, Chapel Hill, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 0 days.

(21) Appl. No.: 11/757,091

(22) Filed: Jun. 1, 2007

(65) Prior Publication Data

US 2008/0301186 A1 Dec. 4, 2008

(51) Int. Cl.
*G06F 15/16* (2006.01)
*H04N 7/10* (2006.01)
*H04N 5/445* (2011.01)

(52) U.S. Cl. ............ 709/202; 709/203; 725/46; 725/34; 725/35

(58) Field of Classification Search .................. 709/202, 709/203
See application file for complete search history.

(56) References Cited

U.S. PATENT DOCUMENTS

| | | |
|---|---|---|
| 4,870,579 A | 9/1989 | Hey |
| 5,621,456 A | 4/1997 | Florin et al. |
| 5,771,778 A | 6/1998 | MacLean, IV |
| 5,956,027 A | 9/1999 | Krishnamurthy |
| 5,960,437 A | 9/1999 | Krawchuk et al. |
| 5,963,916 A | 10/1999 | Kaplan |
| 5,969,283 A | 10/1999 | Looney et al. |
| 6,134,552 A | 10/2000 | Fritz et al. |
| 6,195,657 B1 | 2/2001 | Rucker et al. |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,498,955 B1 | 12/2002 | McCarthy et al. |

(Continued)

FOREIGN PATENT DOCUMENTS

CN 1208930 A 2/1999

(Continued)

OTHER PUBLICATIONS

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.
"Apple—iPod classic," http://www.apple.com/ipodclassic/, printed Oct. 26, 2007, 1 page.
"betterPropaganda—Free MP3s and music videos.," http://www.betterpropagandacom/, copyright 2004-2005 betterPropaganda, printed Feb. 7, 2007, 4 pages.

(Continued)

*Primary Examiner* — Hieu Hoang
(74) *Attorney, Agent, or Firm* — Withrow & Terranova, PLLC

(57) ABSTRACT

A system and method for processing a received media item recommendation message is disclosed. A recipient receives the media item recommendation message which includes a media item identifier of a media item and presence information of a recommender of the media item in association with the media item identifier. The presence information may be in the form of metadata. The recipient may render the presence information and/or store or download the presence information to a media item playlist, to another device, or to a storage medium for subsequent rendering. The media item recommendation message also may include a media item annotation. The media item annotation may also be in the form of metadata and may be rendered and/or stored or downloaded to a media item playlist, to another device, or to a storage medium for subsequent rendering.

26 Claims, 19 Drawing Sheets

U.S. PATENT DOCUMENTS

| | | |
|---|---|---|
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,609,253 B1 | 8/2003 | Swix et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,463,890 B2 | 12/2008 | Herz et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,730,216 B1 | 6/2010 | Issa et al. |
| 7,751,773 B2 | 7/2010 | Linden |
| 7,761,399 B2 | 7/2010 | Evans |
| 7,805,129 B1 | 9/2010 | Issa et al. |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2002/0194356 A1 | 12/2002 | Chan et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0105682 A1 | 6/2003 | Dicker et al. |
| 2003/0115167 A1 | 6/2003 | Sharif et al. |
| 2003/0135513 A1 | 7/2003 | Quinn et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0064306 A1 | 4/2004 | Wolf et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |

| | | |
|---|---|---|
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251566 A1 | 11/2005 | Weel |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1* | 4/2006 | Hayes ................. 369/30.09 |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0224971 A1 | 10/2006 | Paulin et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1* | 12/2006 | Errico et al. ................. 725/46 |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052630 A1 | 2/2008 | Rosenbaum |
| 2008/0059422 A1* | 3/2008 | Tenni et al. ................. 707/3 |
| 2008/0059576 A1 | 3/2008 | Liu et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |
| 2008/0181536 A1 | 7/2008 | Linden |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0250332 A1 | 10/2008 | Farrell et al. |
| 2008/0270561 A1 | 10/2008 | Tang et al. |
| 2008/0276279 A1 | 11/2008 | Gossweiler et al. |
| 2008/0288588 A1 | 11/2008 | Andam et al. |

| | | | |
|---|---|---|---|
| 2008/0301187 | A1 | 12/2008 | Svendsen |
| 2008/0301240 | A1 | 12/2008 | Svendsen |
| 2008/0301241 | A1 | 12/2008 | Svendsen |
| 2008/0306826 | A1 | 12/2008 | Kramer et al. |
| 2008/0319833 | A1 | 12/2008 | Svendsen |
| 2009/0007198 | A1 | 1/2009 | Lavender et al. |
| 2009/0042545 | A1 | 2/2009 | Avital et al. |
| 2009/0049045 | A1 | 2/2009 | Askey et al. |
| 2009/0055467 | A1 | 2/2009 | Petersen |
| 2009/0055759 | A1 | 2/2009 | Svendsen |
| 2009/0069911 | A1 | 3/2009 | Stefik |
| 2009/0069912 | A1 | 3/2009 | Stefik |
| 2009/0070350 | A1 | 3/2009 | Wang |
| 2009/0077124 | A1 | 3/2009 | Spivack et al. |
| 2009/0077220 | A1 | 3/2009 | Svendsen et al. |
| 2009/0129671 | A1 | 5/2009 | Hu et al. |
| 2010/0031366 | A1 | 2/2010 | Knight et al. |

FOREIGN PATENT DOCUMENTS

| | | |
|---|---|---|
| CN | 1841385 A | 10/2006 |
| EP | 0898278 A2 | 2/1999 |
| EP | 1536352 A1 | 6/2005 |
| EP | 1707917 A2 | 10/2006 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006/017622 A2 | 2/2006 |
| WO | 2006075032 A1 | 7/2006 |
| WO | 2006/126135 A2 | 11/2006 |
| WO | 2007/044549 A2 | 4/2007 |
| WO | 2007092053 A1 | 8/2007 |

OTHER PUBLICATIONS

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

"ChoiceStreann Technology Brief, Review of Personalization Technologies: Collaborative Filtering vs. ChoiceStream's Attributized Bayesian Choice Modeling," 13 pages.

"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life >> Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7 2007, 1 page.

"GenieLab::Music Recommendation System," http://web.archive.org/web/20060813000442/http://genielab.com/, copyright 2005 GenieLab, LLC, printed Oct. 26, 2007, 1 page.

"The Daily Barometer—GenieLab.com grants music lovers' wishes," http://media.barometer.orst.edu/home/index.cfm?event=displayArticlePrinterFriendly&uSt..., copyright 2007 The Daily Barometer, printed Feb. 16, 2007, 2 pages.

"Gracenote Playlist," Revised Dec. 29, 2005, 2 pages.

"Gracenote Playlist Plus," Revised Dec. 29, 2005, 2 pages.

"Gracenote," http://www.gracenote.com, printed Feb. 7, 2007, 1 page.

"IEEE 802.11—Wikipedia, the free encyclopedia," http://en.wikipedia.org/wiki/IEEE_802.11, printed Oct. 26, 2007, 5 pages.

"iLikeTM—Home," http://www.ilike.com/, copyright 2007 iLike, printed May 17, 2007, 2 pages.

"The Internet Movie Database (IMDb)," http://www.imdb.com/, copyright 1990-2007 Internet Movie Database Inc., printed Feb. 7, 2007, 3 pages.

"Apple—iPod + iTunes," http://www.apple.com/itunes/, copyright 2007 Paramount Pictures, printed Feb. 7, 2007, 2 pages.

"last.fm the social music revolution," 1 page.

"Last.fm—Wikipedia, the free encyclopedia," http://en.wikipedia.org/wiki/Last.fm, printed Aug. 8, 2006, 7 pages.

"LimeWire—Wikipedia, the free encyclopedia," http://en.wikipedia.org/wiki/LimeWire, printed Aug. 8, 2006, 2 pages.

"liveplasma music, movies, search engine and discovery engine," http://www.liveplasma.com, printed May 17, 2007, 1 page.

"Loomia—Personalized Recommendations for Media, Content and Retail Sites," http://www.loomia.com/, copyright 2006-2007 Loomia Inc., printed Feb. 7, 2007, 2 pages.

"Mercora—Music Search and Internet Radio Network," http://www.mercora.com/overview.asp, copyright 2004-2006 Mercora, Inc., printed Aug. 8, 2006, 1 page.

"Mercora—Music Search and Internet Radio Network," http://www.mercora.com/v6/_front/web.jsp, printed Feb. 7, 2007, 1 page.

"Welcome to the Musicmatch Guide," http://www.mmguide.musicmatch.com/, copyright 2001-2004 Musicmatch, Inc., printed Feb. 7, 2007, 1 page.

"Mongomusic.com—The Best Download mp3 Resources and Information. This website is for sale!," http://www.mongomusic.com/, printed May 17, 2007, 2 pages.

"Take a look at the Future of Mobile Music :: Music Guru," http://www.symbian-freak.com/news/006/02/music_guru.htm, copyright 2005 Symbian freak, printed Feb. 7, 2007, 3 pages.

"Music Recommendations 1.0—MacUpdate," http://www.macupdate.com/info.php/id/19575, printed Feb. 16, 2007, 1 page.

"MusicGremlin," http://www.musicgremlin.com/StaticContent.aspx?id=3, copyright 2005, 2006, 2007 MusicGremlin, Inc., printed Oct. 26, 2007, 1 page.

"MusicIP—The Music Search Engine," http://www.musicip.com/, copyright 2006-2007 MusicIP Corporation, printed Feb. 7, 2007, 1 page.

"Digital Music News," http://www.digitalmusicnews.com/results?title=musicstrands, copyright Jun. 2003 Digital Music News, printed Aug. 8, 2006, 5 pages.

"Musicstrands.com Because Music is Social," copyright 2006 MusicStrands, Inc., 2 pages.

"MyStrands for Windows 0.7.3 Beta," copyright 2002-2006 ShareApple.com networks, printed Jul. 16, 2007, 3 pages.

"MyStrands for Windows Change Log," http://www.mystrands.com/mystrands/windows/changelog.vm, printed Jul. 16, 2007, 6 pages.

"MyStrands Download," http://www.mystrands.com/overview.vm, printed Feb. 7, 2007, 3 pages.

"Napster—All the Music You Want," http://www.napster.com/using_napster/all_the_music_you_want.html, copyright 2003-2006 Napster, LLC, printed Feb. 7, 2007, 2 pages.

"Try Napster free for 7 Days—Play and download music without paying per song.," http://www.napster.com/choose/index.html, copyright 2003-2007 Napster, LLC, printed Feb. 7, 2007, 1 page.

"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.

"Rhapsody—Full-length music, videos and more—Free," http://www.rhapsody.com/welcome.html, copyright 2001-2007 Listen.com, printed Feb. 7, 2007, 1 page.

Badrul M. Sarwar et al., "Recommender Systems for Large-scale E-Commerce: Scalable Neighborhood Formation Using Clustering," 2002, 6 pages.

"Soundflavor," http://www.soundflavor.com/, copyright 2003-2007 Soundflavor, Inc., printed Feb. 7, 2007, 1 page.

"that canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.

"UpTo11.net—Music Recommendations and Search," http://www.upto11.net/, copyright 2005-2006 Upto11.net, printed Feb. 7, 2007, 1 page.

"Webjay—Playlist Community," http://www.webjay.org/, copyright 2006 Yahoo! Inc., printed Feb. 7, 2007, 5 pages.

"Wired News:," http://www.wired.com/news/digiwoo/1,57634-0.html, copyright 2005 Lycos, Inc., printed Oct. 9, 2006, 3 pages.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo Music Jukebox—Wikipedia, the free encyclopedia," http://en.wikipedia.org/wiki/Yahoo_music_engine, printed Aug. 8, 2006, 1 page.

"Goombah—Preview," http://www.goombah.com/preview.html, printed Jan. 8, 2008, 5 pages.

Jeff Mascia et al., "Lifetrak: Music in Tune With Your Life," copyright 2006, 11 pages.

Jun Wang et al., "Music Recommender System for Wi-Fi Walkman," Delft University of Technology, 23 pages.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"YouTube—Broadcast Yourself.," http://www.youtube.com/, copyright 2007 YouTube, LLC, printed Oct. 26, 2007, 2 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Outlook Home Page—Microsoft Office Online," http://office.microsoft.com/en-us/outlook/default.aspx, copyright 2007 Microsoft Corporation, printed Nov. 8, 2007, 1 page.

"Thunderbird—Reclaim your inbox," http://www.mozilla.com/en-US/thunderbird/, copyright 2005-2007 Mozilla, printed Nov. 8, 2007, 2 pages.

"RYM FAQ—Rate Your Music," http://rateyourmusic.com/faq/, copyright 2000-2007 rateyournnusic.com, printed Nov. 8, 2007, 14 pages.

"Trillian (software)—Wikipedia, the free encyclopedia," http://en.wikipedia.org/wiki/Trillian_(instant_messenger), printed Nov. 8, 2007, 11 pages.

"Not safe for work—Wikipedia, the free encyclopedia," http://en.wikipedia.org/wiki/Work_safe, printed Nov. 8, 2007, 2 pages.

"Zune.net—How-To—Share Audio Files Zune to Zune," http://web.archive.org/web/20070819121705/http://www.zune.net/en-us/support/howto/z..., copyright 2007 Microsoft Corporation, printed Nov. 14, 2007, 2 pages.

"LAUNCHcast Radio—Yahoo! Messenger," http://messenger.yahoo.com/launch.php, copyright 2007 Yahoo! Inc., printed Nov. 8, 2007, 1 page.

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.

Yahoo! Music downloaded archival page from www.archive.org for Jun. 20, 2005, copyright 2005 Yahoo! Inc., 14 pages.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

"Identifying iPod models," http://support.apple.com/kb/HT1353, printed Feb. 24, 2010, 13 pages.

Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.

"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

"Hulu—About," www.hulu.com/about/product_tour, copyright 2010 Hulu LLC, printed Jun. 15, 2010, 2 pages.

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

"SongReference," http://songreference.com/, copyright 2008, SongReference.com, printed Jun. 15, 2010, 1 page.

"14 Exciting Finalists Announced in Popkomm—IMEA Awards," Netherlands Corporate News, Business Wire, Aug. 3, 2005, at <http://www.netherlandscorporatenews.com/archive/en/2005/09/14/f003.htm>, printed Apr. 1, 2011, 6 pages.

Abstract, Chinese Patent Publication No. 1841385A, published Oct. 4, 2006, "Method of supplying content data and playlist thereof," Chinese Patent Application No. 20061073372, filed Mar. 31, 2006, Applicant: Sony Corp, Inventor: Taken Miyajima Yasushi Yamashi, obtained from http://www.espacenet.com, 1 page.

Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.

Kirkpatrick, M., "Be an iTunes DJ with SpotDJ," TechCrunch, Oct. 16, 2006, at <http://techcrunch.com/2006/10/16/be-an-itunes-dj-with-spotdj/>, printed Apr. 8, 2011, 3 pages.

"LAUNCHcast Radio," Yahoo! Messenger, dated Jun. 12, 2004, at <http://messenger.yahoo.com/launch.php>, obtained from the Internet Archive, printed Apr. 6, 2011, 1 page.

Mainelli, T., "New MP3 Player Ready to Rival IPod," PCWorld, Jan. 10, 2003, at <http://www.pcworld.com/article/108608/new_mp3_player_ready_to_rival_ipod.html>, printed Apr. 1, 2011, 3 pages.

Oates, J., "An MP3 player you can talk to . . . Muttering nutters with headphones," The Register, Jan. 19, 2005, at <http://www.theregister.co.uk/2005/01/19/ipod_listens/>, printed Apr. 1, 2011, 2 pages.

Samiljan, T., "Hype Check: Sansa Connect," Switched, Apr. 23, 2007, at <http://www.switched.com/2007/04/23/hype-check-sansa-connect/>, printed Apr. 1, 2011, 3 pages.

"Share Audio Files Zune to Zune," dated Dec. 8, 2006, at <http://www.zune.net/en-us/support/howto/zunetozune/sharesongs.htm>, copyright 2006, Microsoft Corporation, obtained from the Internet Archive, printed Apr. 6, 2011, 2 pages.

Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.

"BuddyList: list your social network," at <http://drupal.org/handbook/modules/buddylist>, available on Internet Archive as early as Jan. 2006, printed Jul. 12, 2007, 1 page.

Freeman, Anne, "Find Out About: GorillaPop Artist/Fan Community," Jul. 4, 2005, MusicDish Industry e-Journal, at <http://www.musicdish.com/mag/indexphp3?id=10305>, copyright 1997-2007, MusicDish L.L.C., printed Jul. 12, 2007, 7 pages.

"OpenID and Social Networking," Dec. 3, 2006, at <http://www.apparently.me.uk/623.html>, printed Jul. 12, 2007, 2 pages.

"Social Networking and Music: MySpace Puts it All Together in a Virtual Community," by Scott G., submitted on Mar. 3, 2005, found at <http://ezinearticles.com/?Social-Networking-and-Music:-MySpace-Puts-It-All-Together-in. . .>, printed Jul. 12, 2007, 4 pages.

"Ringo: Social Information Filtering for Music Recommendation," http://jolomo.net/ringo.html, printed Aug. 3, 2009, 1 page.

"Tour's Profile," http://mog.com/Tour, copyright 2006-2009 Mog Inc., printed Aug. 3, 2009, 11 pages.

"Babulous :: Keep it loud," http://www.babulous.com/home.jhtml, copyright 2009 Babulous, Inc., printed Mar. 26, 2009, 2 pages.

* cited by examiner

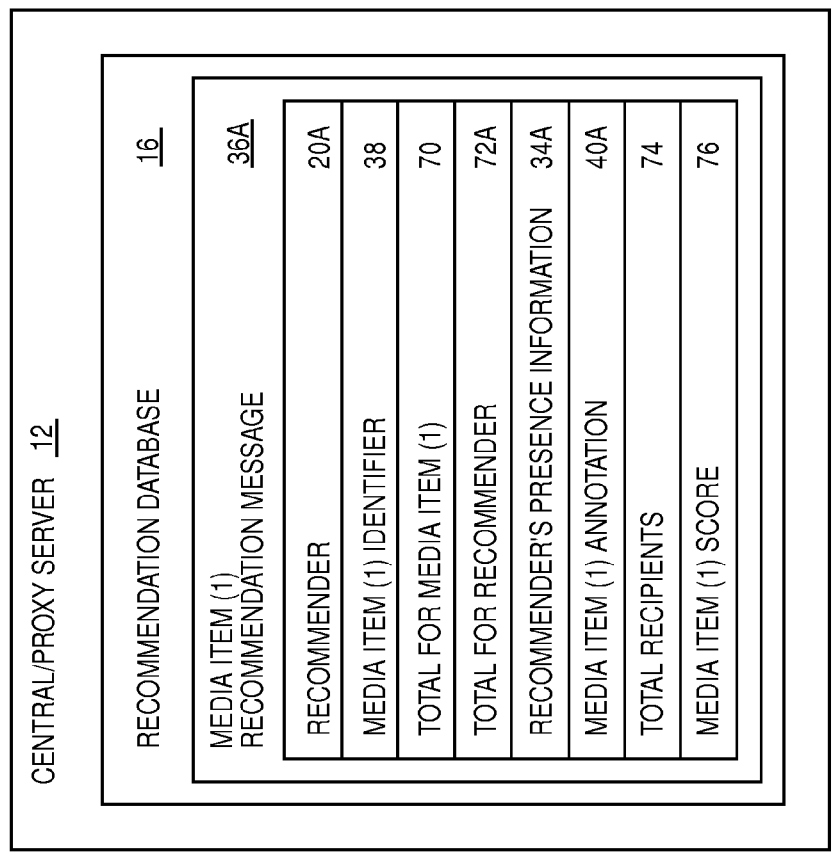
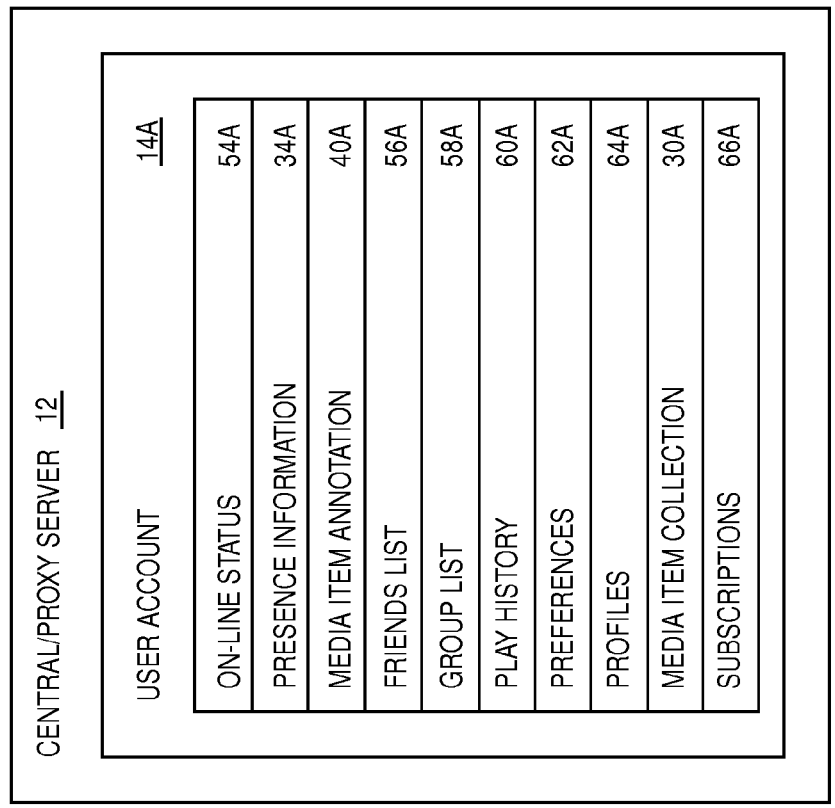
FIG. 9
FIG. 8

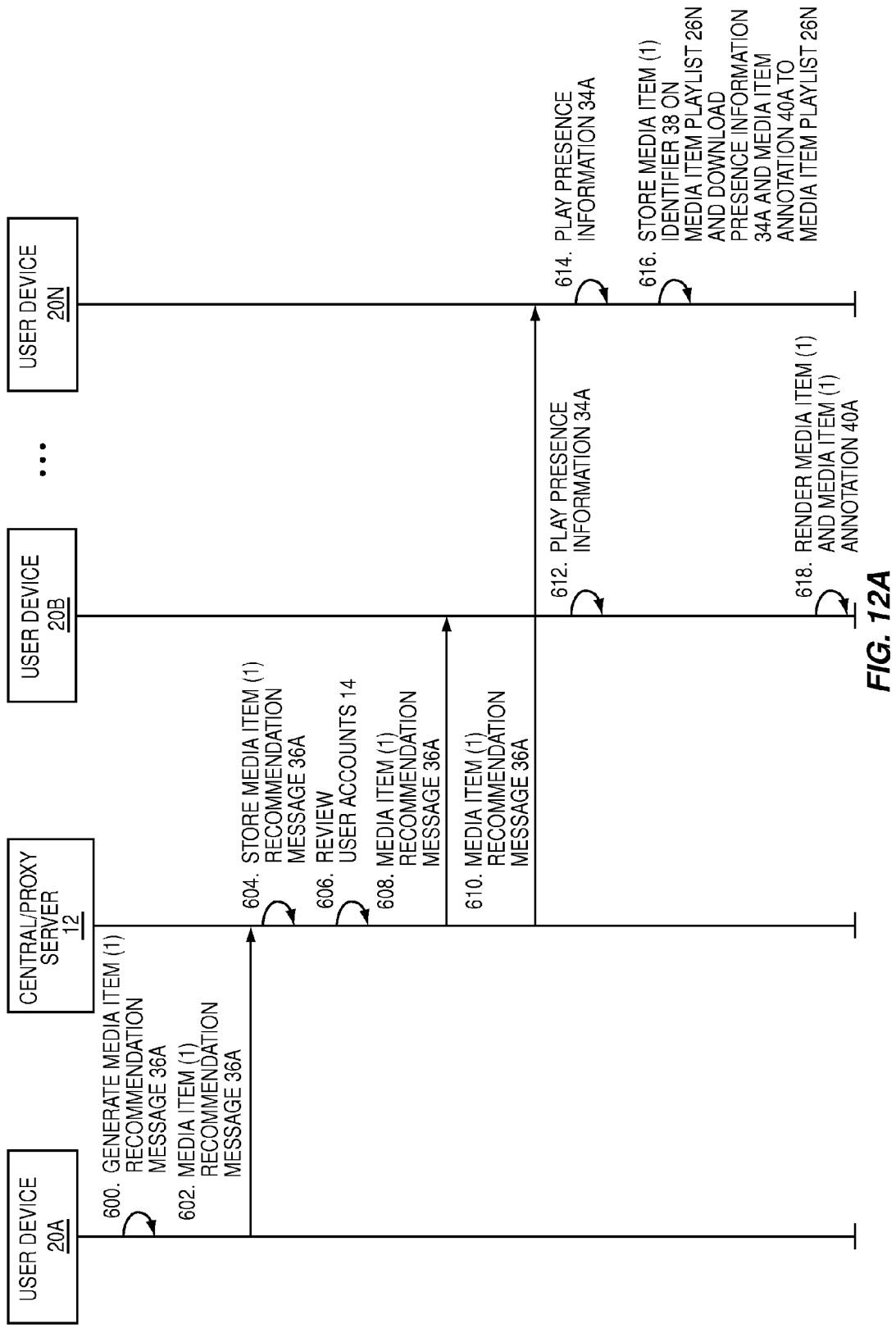

SYSTEM AND METHOD FOR PROCESSING A RECEIVED MEDIA ITEM RECOMMENDATION MESSAGE COMPRISING RECOMMENDER PRESENCE INFORMATION

RELATED APPLICATIONS

The present application is related to commonly assigned U.S. patent applications Ser. No. 11/757,079, filed Jun. 1, 2007, entitled "SYSTEM AND METHOD FOR PROPAGATING A MEDIA ITEM RECOMMENDATION MESSAGE COMPRISING RECOMMENDER PRESENCE INFORMATION"; Ser. No. 11/757,083, filed Jun. 1, 2007, entitled "SYSTEM AND METHOD OF GENERATING A MEDIA ITEM RECOMMENDATION MESSAGE WITH RECOMMENDER PRESENCE INFORMATION"; and Ser. No. 11/757,097, filed Jun. 1, 2007, entitled "ENHANCED MEDIA ITEM PLAYLIST COMPRISING PRESENCE INFORMATION," which are hereby incorporated herein in their entirety.

FIELD OF THE INVENTION

The present invention relates to a system and method for processing a received media item recommendation message comprising recommender presence information and, optionally, a media item annotation.

BACKGROUND OF THE INVENTION

In recent years, there has been an enormous increase in the amount of digital media available online. Services, such as Apple's iTunes® for example, enable users to legally purchase and download music. Other services, such as Yahoo!® Music Unlimited and RealNetwork's Rhapsody®, provide access to millions of songs for a monthly subscription fee. YouTube® provides users access to video media. As a result, media items have become much more accessible to consumers worldwide. Due to the large amount of the accessible digital media, recommendation technologies are emerging as an important enabler to assist users in identifying and navigating large databases of available media. Recommendations are useful to help users identify and select media items of interest for usage and/or play.

Recommendations may be programmatically-generated by a company based on the user's predefined preferences and/or profiles. Recommendations also may be provided by other users. Particularly, the users may be peers on a social network. The social network provides for the exchange of media item recommendations among the users. As such, the user on the social network may be both a recommender user of media items to other users and a recipient user of media item recommendations from other users. In this manner, the user may receive a media item recommendation from another user and transmit a media item recommendation to other users.

Typically, the users on the social network have some type of relationship. For example, the users may be friends, acquaintances, or members of a defined group or community. Because of these relationships, the users may have similar traits, profiles, likes and dislikes, and/or media item preferences. Therefore, the social networks provide an opportunity to develop and strengthen the interaction between the users not only with respect to the media items, but also with respect to the users personally. The development and strengthening of the user interaction promotes the continued use of the social network for media item recommendations and the acquisition and playing of the media items recommended.

Promoting the use of the social network could be better accomplished if the media item recommendation included additional information of the recommender incorporated into the media item recommendation. The additional information may provide personal information of the recommender and/or information about the recipient, the media item, or the artist. In addition, if the recipient had the flexibility to display the personal information at the times and on the devices as desired by the recipient, it would increase the recipient's enjoyment, education, and entertainment.

However, current media item recommendation applications do not allow the recommender to include personal information in a media item recommendation or the recipient to display the personal information at times and on devices as desired by the recipient. Accordingly, a need exists for a media item recommendation system and method that allows a recipient to receive a media item recommendation that includes personal information and to display the personal information at times and on devices as desired.

SUMMARY OF THE INVENTION

The present invention is a system and method for processing a received media item recommendation message. A recipient receives the media item recommendation message which includes a media item identifier of a media item and presence information of a recommender of the media item in association with the media item identifier. The presence information may be in the form of metadata. The recipient may render the presence information and/or store or download the presence information to a media item playlist, to another device, or to a storage medium for subsequent rendering. The media item recommendation message also may include a media item annotation. The media item annotation may also be in the form of metadata and may be rendered and/or stored or downloaded to a media item playlist, to another device, or to a storage medium for subsequent rendering.

The media item identifier may be any unique identifier for that media item and, in addition to identifying the media item, may be used to access the media item for rendering. The presence information of the recommender may be any recommender-specific information, for example a unique identifier and/or a unique, novel, and/or creative tag presentation in audio, visual, and/or textual format, which signifies and associates with the recommender. The media item annotation may be any additional information which the recommender desires to incorporate into the media item recommendation message. The media item annotation may be personal messages and/or may be media item-related. The media item annotation may be in audio, visual, and/or textual format, and may be, for example, a personal message or picture, a critical review of the media item, and/or an image of the artist.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 8 is a block diagram illustrating components of an exemplary user account in a central/proxy server according to one embodiment of the present invention;

FIG. 9 is a block diagram illustrating components of an exemplary recommendation database in the central/proxy server according to one embodiment of the present invention;

Figure 4:
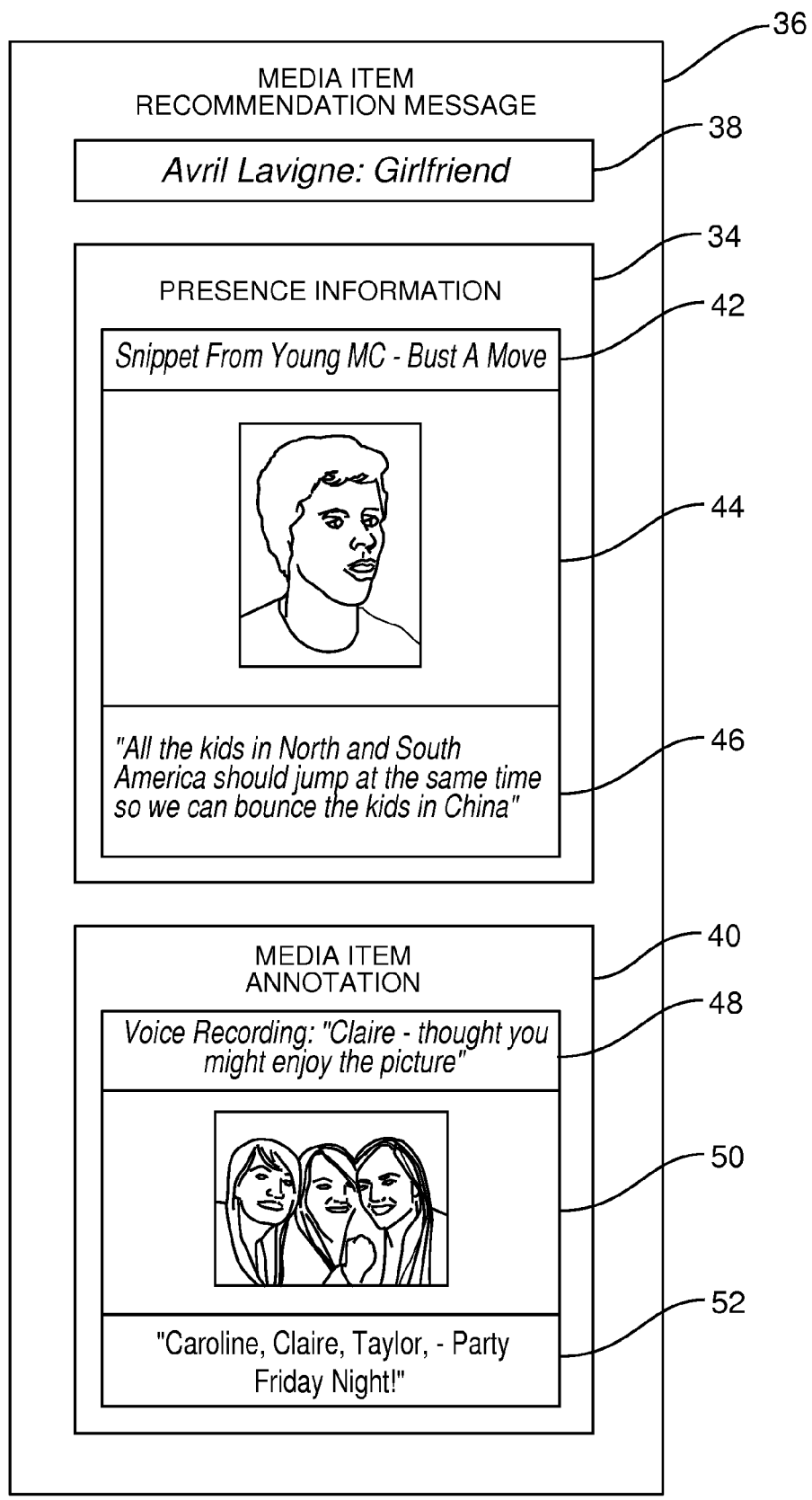
FIG. 4 is the media item recommendation message in which an exemplary media item identifier, presence information, and media item annotation are illustrated.
Figure 12B:
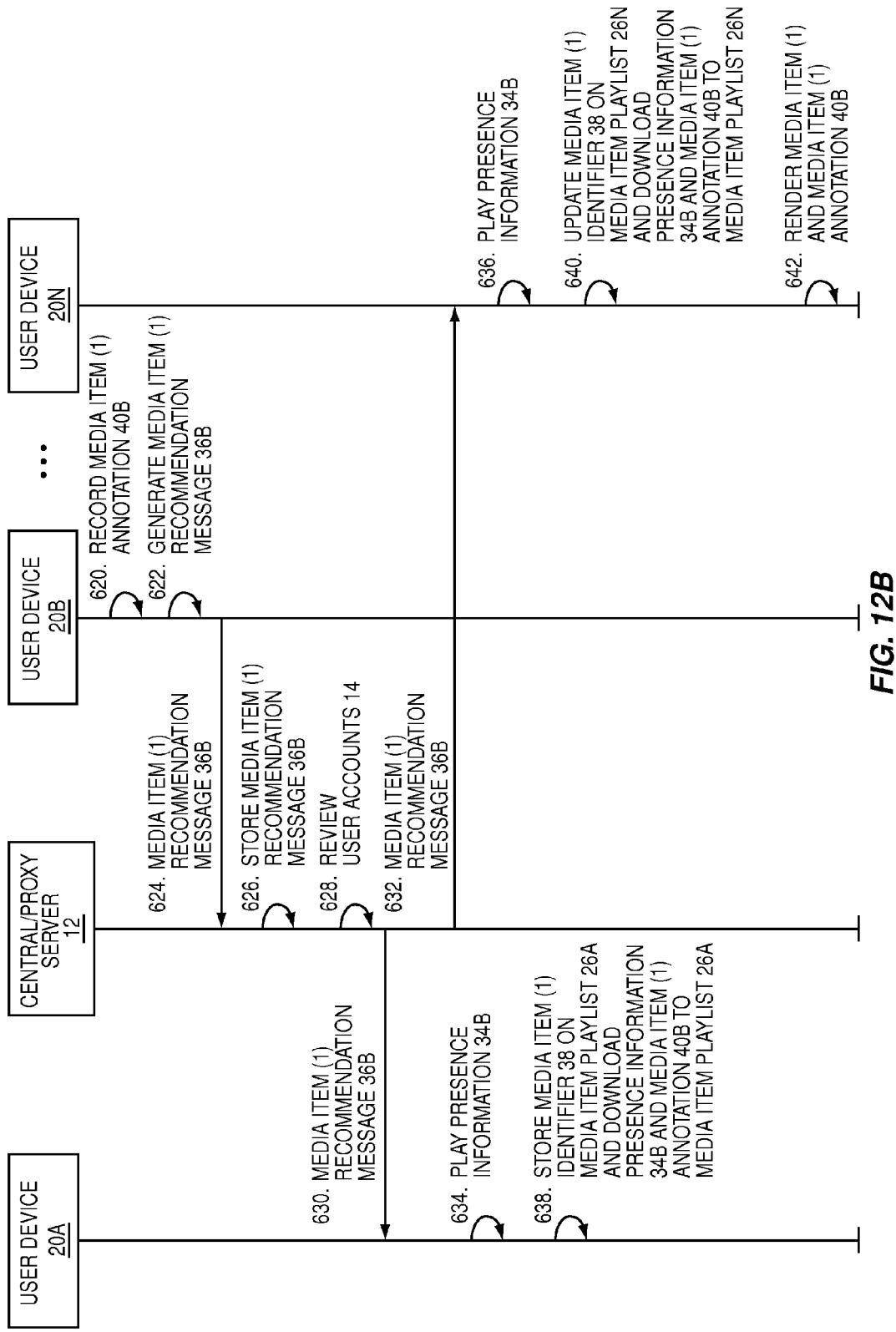
Figure 12C:
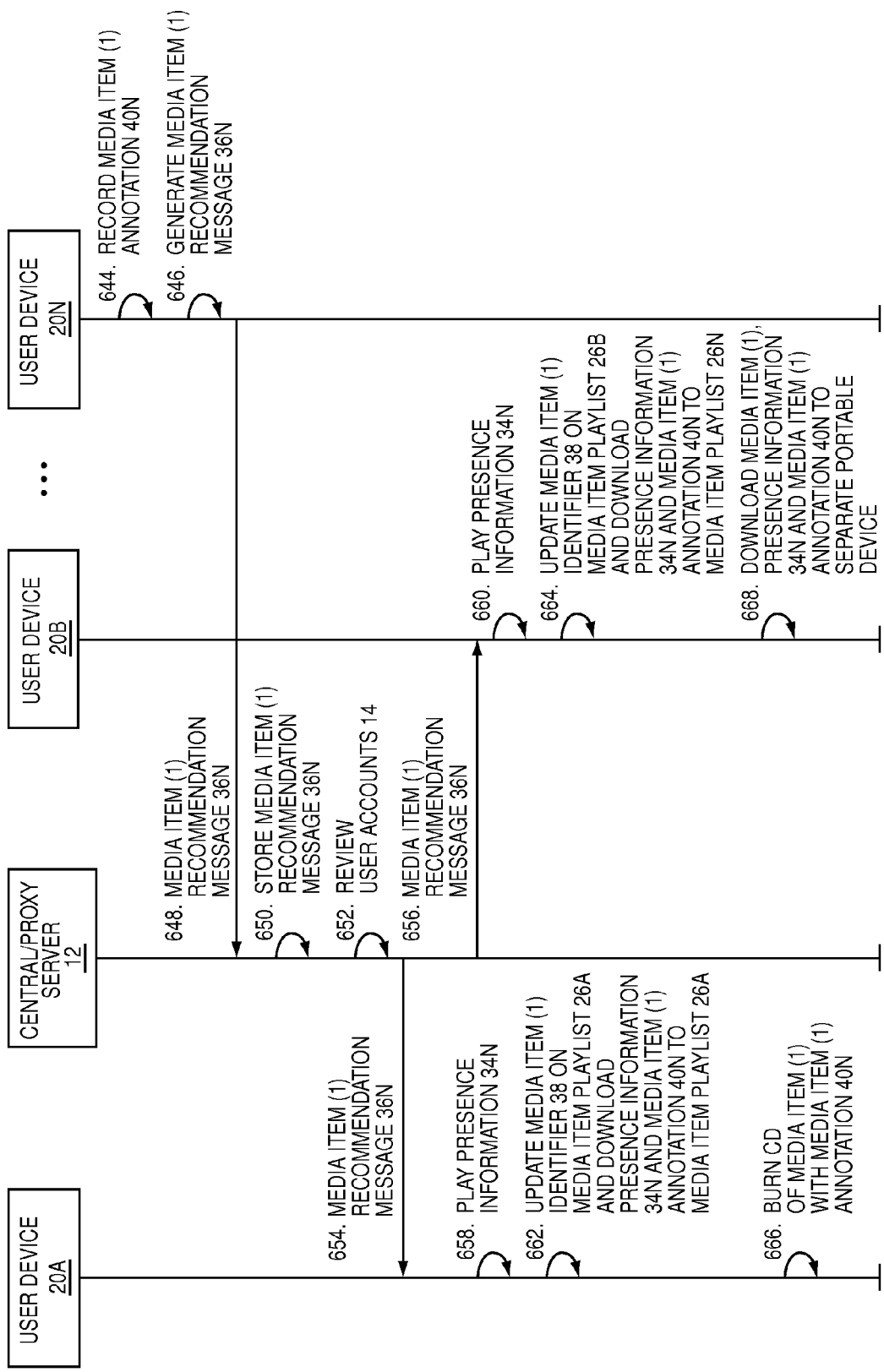
Figure 13:
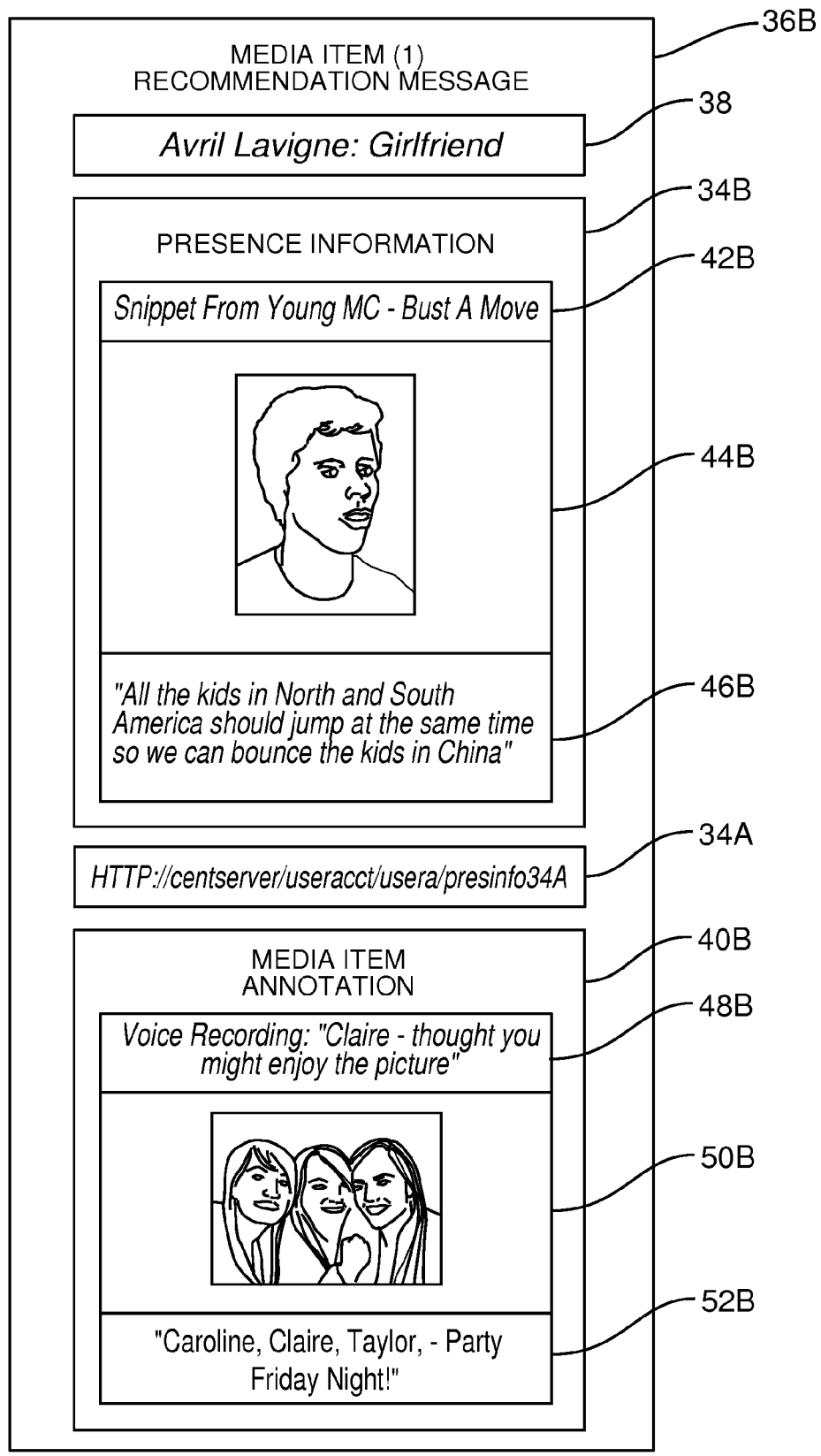

FIGS. 12A, 12B, and 12C illustrate exemplary communication flow diagrams between the central/proxy server and the user devices, wherein the media item recommendation message is propagated among the user devices of the media item recommendation system according to one embodiment of the present invention;

FIG. 13 is the media item recommendation message of FIG. 4 with additional detail illustrating an exemplary media item identifier, presence information of two recommenders, and a media item annotation.

Figure 1:
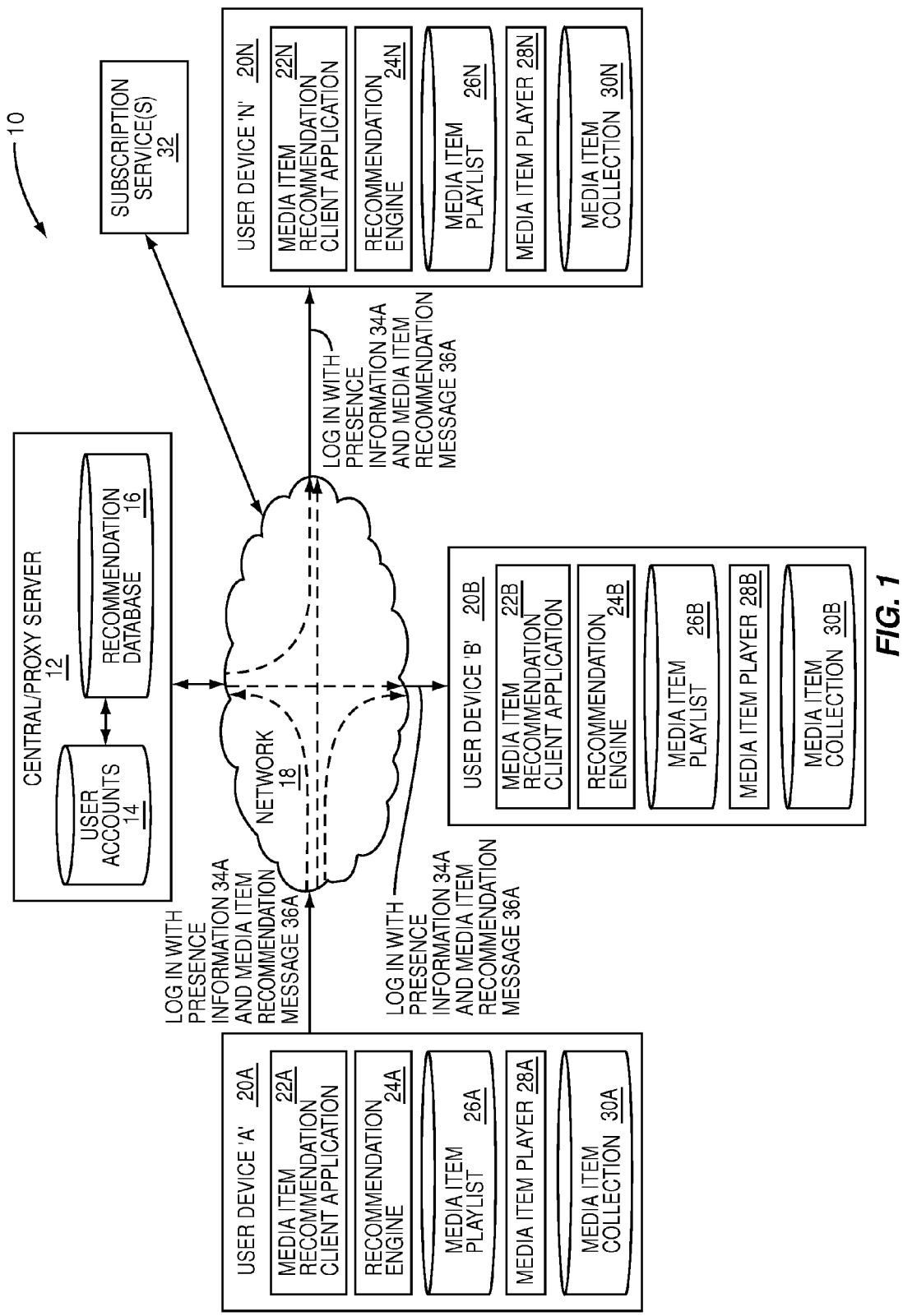
FIG. 1 illustrates a user-server media item recommendation system, wherein media item recommendation messages including a recommender's presence information are transmitted to a central/proxy server and propagated on among recipients.
Figure 11:
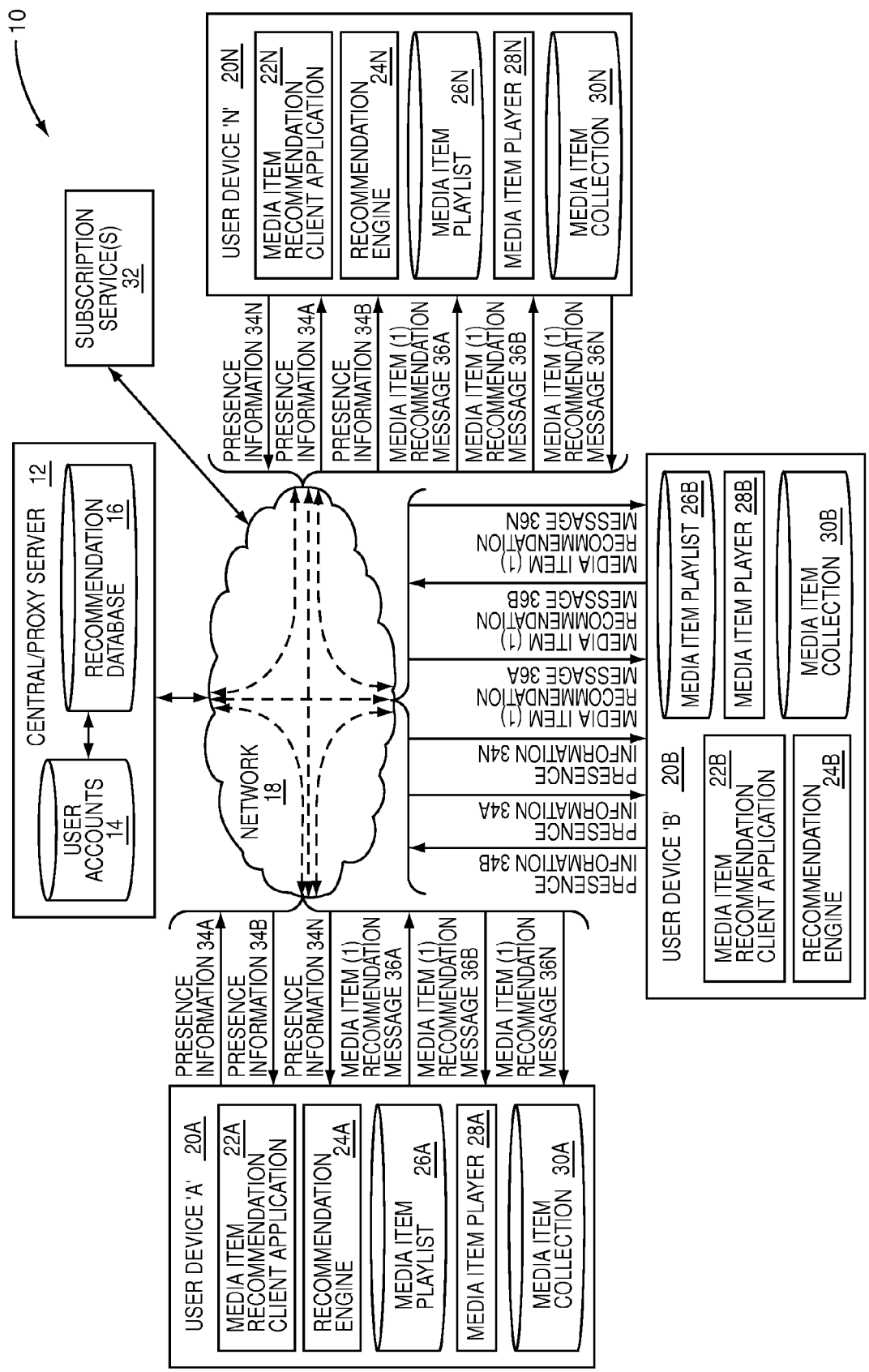
FIG. 11 is the user-server system of FIG. 1 further illustrating in more detail the transmission of the presence information and the propagation of the media item recommendation message among the user devices of the media item recommendation system according to one embodiment of the present invention.
Figure 14:
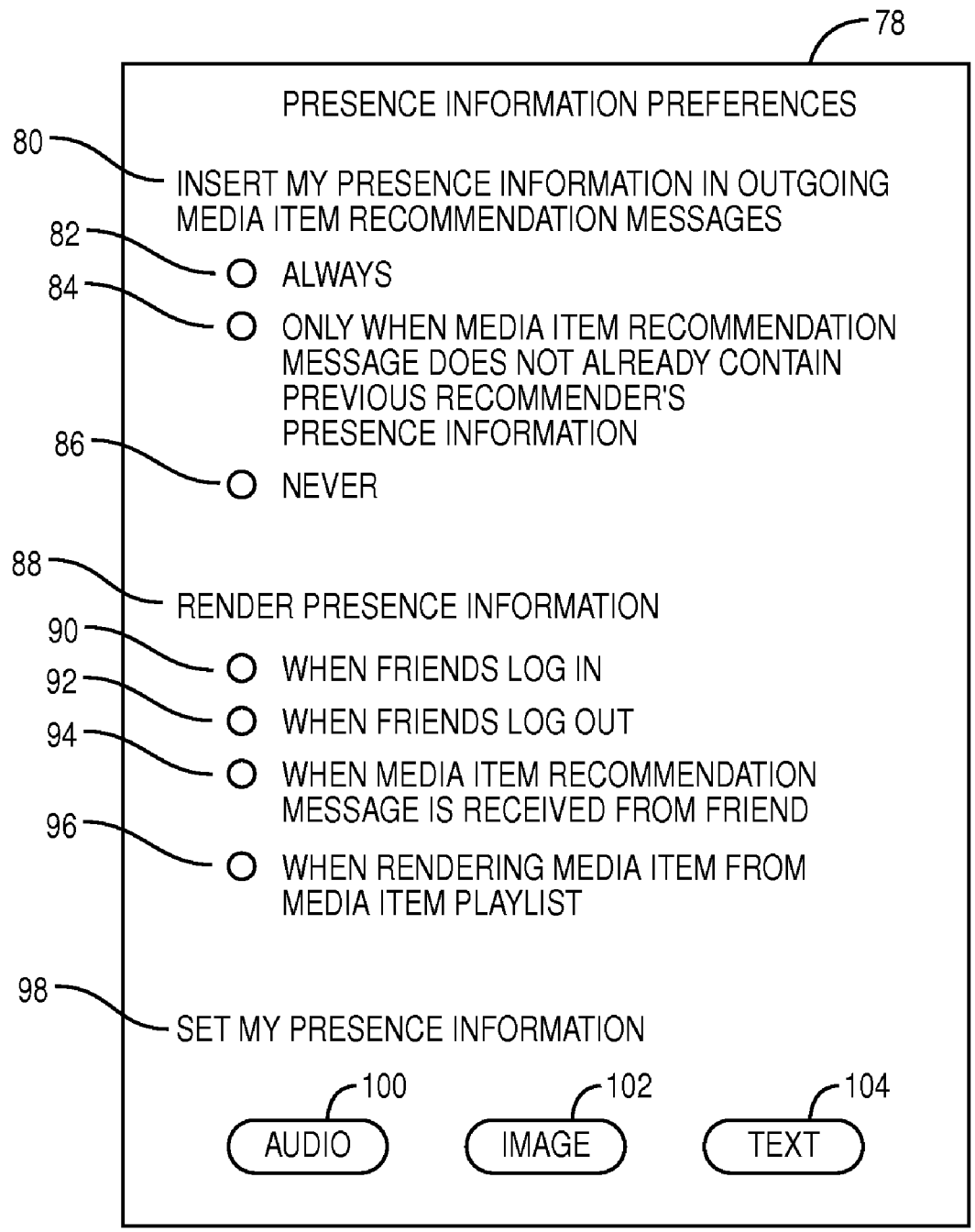
Figure 15:
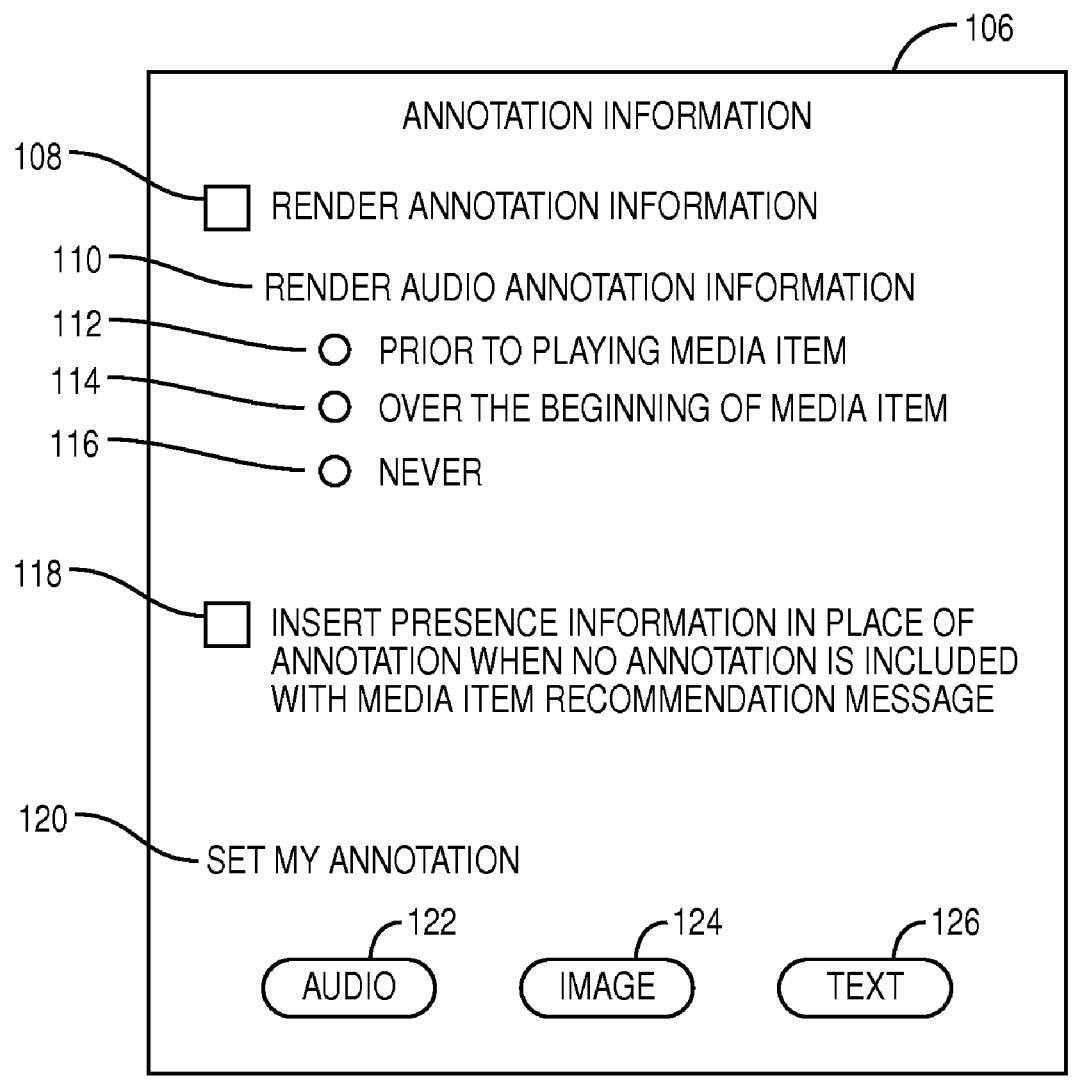
Figure 17:
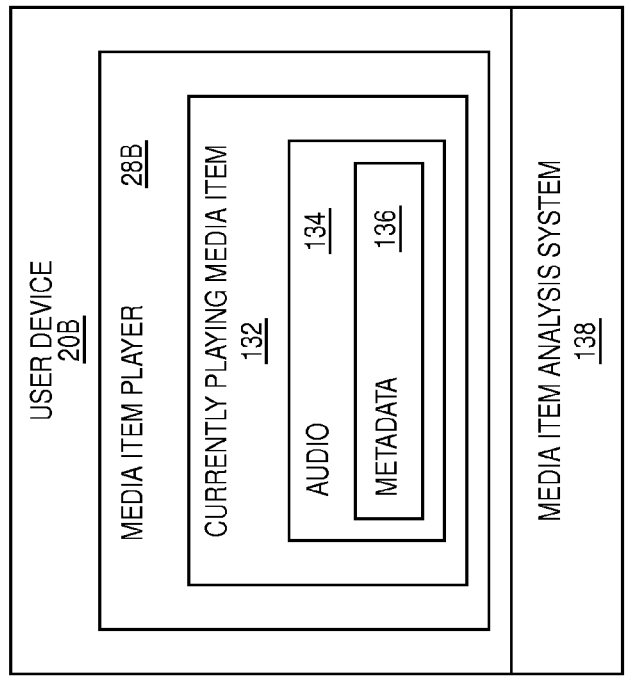
Figure 16:
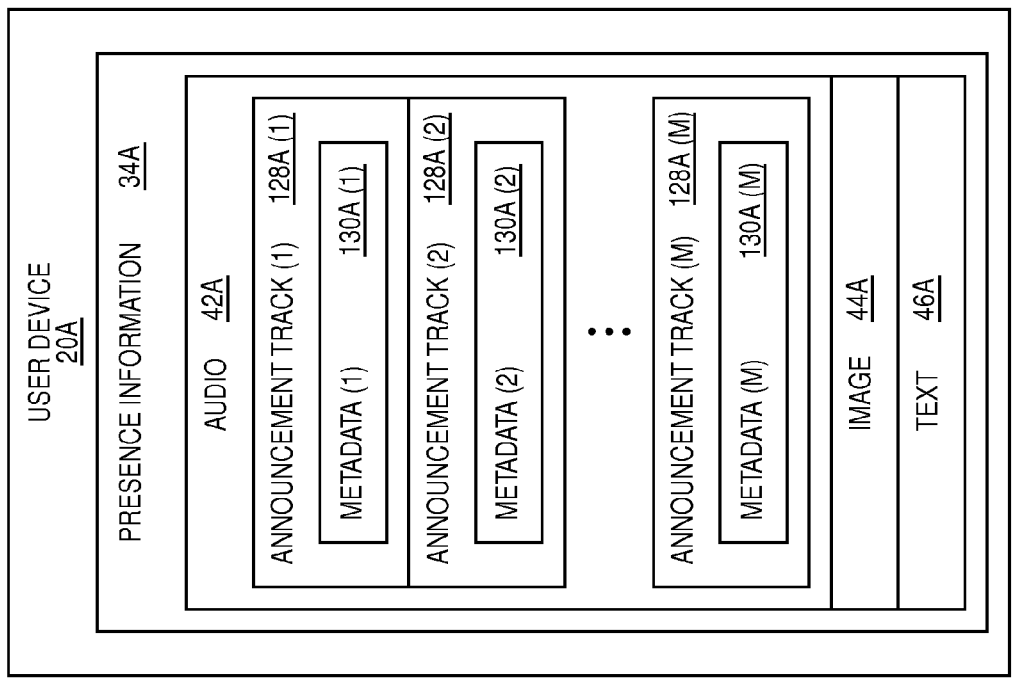
Figure 18:
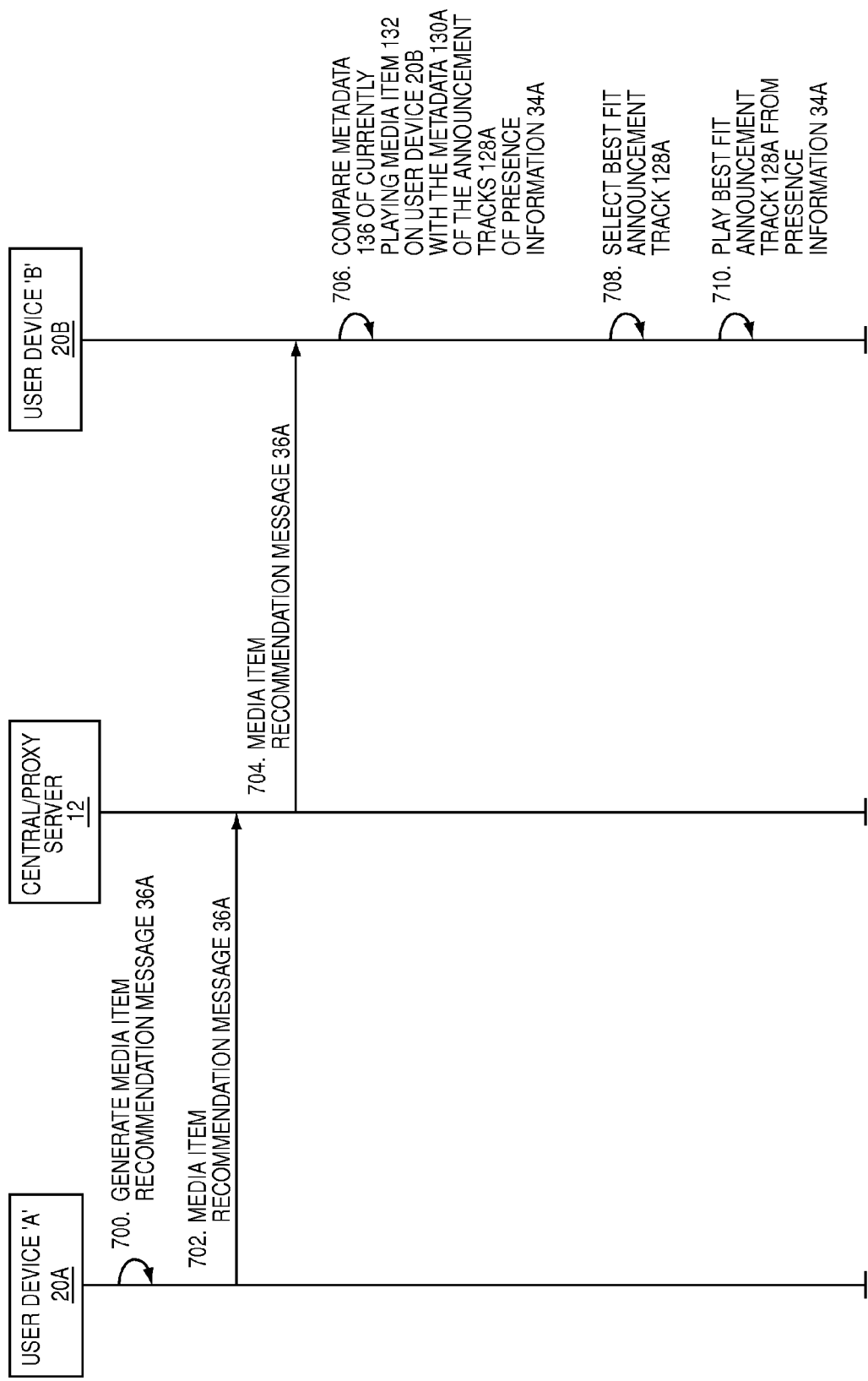
Figure 20:
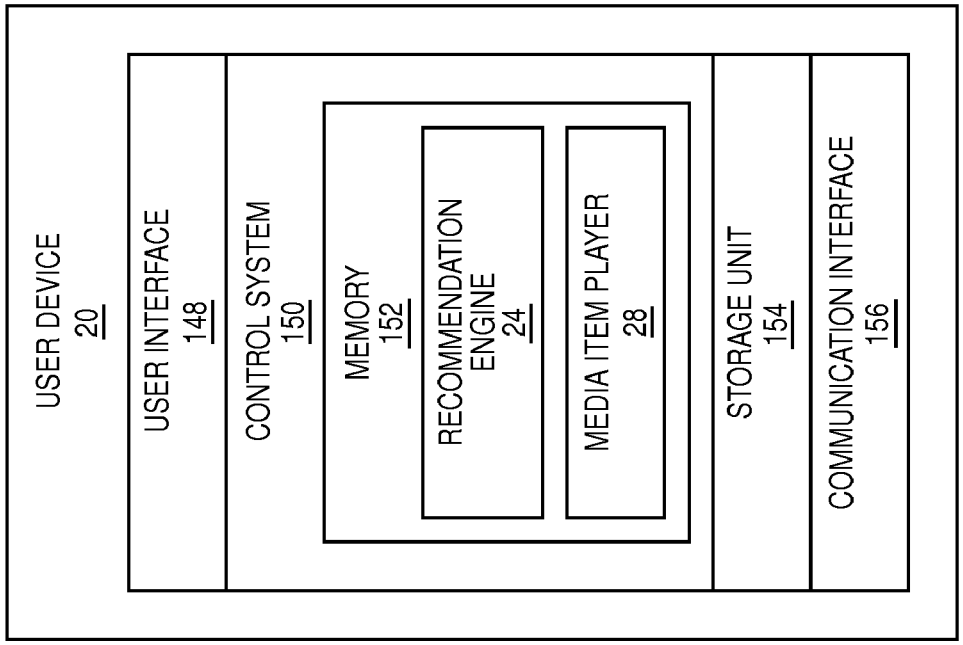
Figure 19:
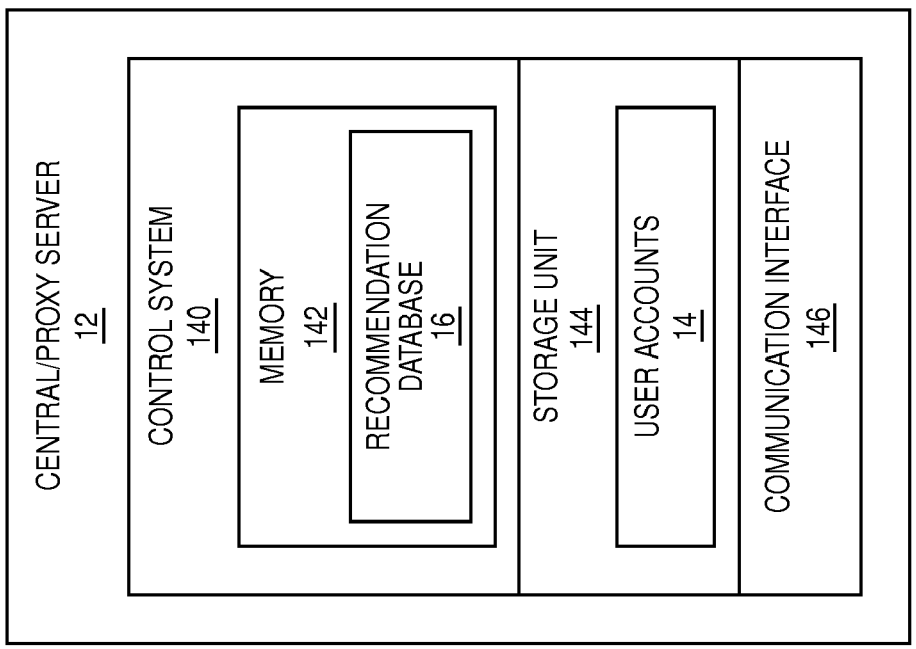

FIG. 14 illustrates an exemplary graphical user interface (GUI) for providing presence information preferences according to one embodiment of the present invention;

FIG. 15 illustrates an exemplary GUI for providing the media item annotation information according to one embodiment of the present invention;

FIG. 16 is a block diagram illustrating more detail regarding the components of the presence information according to one embodiment of the present invention;

FIG. 17 is a block diagram illustrating components of an exemplary media item player according to one embodiment of the present invention;

FIG. 18 illustrates an exemplary communication flow diagram between the central/proxy server and the user devices, wherein metadata of a currently playing media item on the recipient user device is compared to metadata of announcement tracks incorporated in the recommender presence information to determine a best fit announcement track according to one embodiment of the present invention;

FIG. 19 is a block diagram illustrating more detail regarding components on the central/proxy server of FIGS. 1 and 11 according to one embodiment of the present invention; and FIG. 20 is a block diagram illustrating more detail regarding components on the user device of FIGS. 1 and 11 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present application is related to commonly assigned U.S. patent applications Ser. No. 11/757,079, filed Jun. 1, 2007, entitled "SYSTEM AND METHOD FOR PROPAGATING A MEDIA ITEM RECOMMENDATION MESSAGE COMPRISING RECOMMENDER PRESENCE INFORMATION"; Ser. No. 11/757,083, filed Jun. 1, 2007, entitled "SYSTEM AND METHOD OF GENERATING A MEDIA ITEM RECOMMENDATION MESSAGE WITH RECOMMENDER PRESENCE INFORMATION"; and Ser. No. 11/757,097, filed Jun. 1, 2007, entitled "ENHANCED MEDIA ITEM PLAYLIST COMPRISING PRESENCE INFORMATION," which are hereby incorporated herein in their entirety.

The present invention is a system and method for processing a received media item recommendation message. The recipient receives the media item recommendation message which includes a media item identifier of a media item and presence information of a recommender of the media item in association with the media item identifier. The presence information may be in the form of metadata. The recipient may render the presence information and/or store or download the presence information to a media item playlist, to another device, or to a storage medium for subsequent rendering. The media item recommendation message also may include a media item annotation. The media item annotation may also be in the form of metadata and may be rendered and/or stored or downloaded to a media item playlist, to another device, or to a storage medium for subsequent rendering.

The media item identifier may be any unique identifier for that media item and, in addition to identifying the media item, may be used to access the media item for rendering. The presence information of the recommender may be any recommender-specific information, for example a unique identifier and/or a unique, novel, and/or creative tag presentation in audio, visual, and/or textual format, which signifies and associates with the recommender. The media item annotation may be any additional information which the recommender desires to incorporate into the media item recommendation message. The media item annotation may be personal messages and/or may be media item-related. The media item annotation may be in audio, visual, and/or textual format, and may be, for example, a personal message or picture, a critical review of the media item, and/or an image of the artist.

The user on the media item recommendation system may be the recommender and/or the recipient. For purposes of the present invention, when describing a user that is transmitting a media item recommendation message, the term "recommender" will be used, and when describing a user that is receiving a media item recommendation message, the term "recipient" will be used. Additionally, when the terms "transmit" and "send," and variations thereof, are used herein, it should be understood that those terms refer to the same action and, therefore, have the same meaning.

FIG. 1 illustrates an exemplary media item recommendation system 10 for providing and propagating media item recommendation messages. Before discussing how the media item recommendation system 10 provides and propagates media item recommendation messages incorporating presence information that are received and processed, a brief overview of the media item recommendation system 10 follows first. In this example, the media item recommendation system 10 has a central/proxy server 12 that manages the flow of information and services provided to users of the media item recommendation system 10. The central/proxy server 12 may be comprised of a database of user accounts 14 and a recommendation database 16. The user accounts 14 contains a record of accounts for each user known to the central/proxy server 12 and information concerning aspects of the user's activities on the media item recommendation system 10. The information in the user accounts 14 may include user profiles, preferences, play histories, and other information about the user and the user's media collections. The recommendation database 16 stores a record of the media item recommendation messages that are provided on the media item recommendation system 10. The central/proxy server 12 is also able to communicate with other devices and systems over a network 18. The network 18 may be any private network or distributed public network such as, but not limited to, the Internet.

In this example, the central/proxy server 12 operates in a user-server relationship with users. However, it should be noted that the present invention may be implemented in a peer-to-peer configuration where features of the central/proxy server 12 are provided by a "super" peer device. The central/proxy server 12, in whatever form provided, provides media-based services to the user. Note that the central/proxy server 12 also may be implemented as a number of servers operating in a collaborative fashion. An example of a media item recommendation system that may be implemented in a user-server or peer-to-peer configuration is described in co-pending U.S. patent application Ser. No. 11/484,130, entitled "P2P NETWORK FOR PROVIDING REAL TIME MEDIA RECOMMENDATIONS," filed Jul. 11, 2006, which is incorporated herein by reference in its entirety.

The media item recommendation system 10 also includes a number of user devices 20A-20N which may communicate with the central/proxy server 12 and each other via the network 18. Also note that while three user devices 20A, 20B, 20N are illustrated, the present invention may be used with any number of two or more user devices 20. The user devices 20 may be any type of computing device that is capable of performing communications over the network 18 to reach the central/proxy server 12 and other user devices 20. Each of the user devices 20 may also include a user interface which may include components such as a display, speakers, a user input device, and the like. Examples of user devices 20 include, but are not limited to, home computers; computers at work; laptop computers; wireless portable media player (PMP) devices; hand-held computer devices, such as personal digital assistants (PDA) with remote communication capabilities; and the like.

Each user who desires to access and receive the services of the central/proxy server 12 first establishes a user account 14 with the central/proxy server 12. This allows the user device 20 to receive and download a media item recommendation client application 22, which provides a customized software interface to the central/proxy server 12. After the media item recommendation client application 22 is downloaded onto a user device 20, the media item recommendation client application 22 executes on the user device 20.

The user device 20 may also contain a recommendation engine 24. The recommendation engine 24 is a program, algorithm, or control mechanism that handles sending and/or receiving media item recommendation messages over the network 18. The recommendation engine 24 may also score media items based on user preferences for the different media categories, for example, user, genre, artist, title, album, lyrics, date of release, or the like, and then filter recommendations from the other user devices 20 based on such preferences.

The user device 20 also typically contains a media item playlist 26 and a media item player 28. The media item playlist 26 may include information concerning media items and/or media item recommendation messages, including, for example, the titles of media items and/or the media item recommendation messages, the artists, the score, and other information concerning the media items. The media item player 28 allows the user to use or play back any media item desired. Examples of media item players 28 include but are not limited to Apple® iTunes®, Apple® iPOD®, and the like. The media items selected for use and/or play include those stored locally at the user device 20 in a user's media item collection 30, and/or any media item accessed from the central/proxy server 12, another user device 20, subscription service(s) 32, and/or any other system accessible by or coupled to the network 18.

In accordance with one embodiment of the present invention, presence information 34 may be provided by the user to the media item recommendation system 10. Initially, the user, using the user device 20, develops and provides the presence information 34. The presence information 34 may be any personal, unique, novel, and/or creative tag presentation, or other identifying information of the user. The user device 20 stores the presence information 34 and transmits the presence information 34 to the central/proxy server 12 whenever the user device 20 logs in to the media item recommendation system 10 by attaching the presence information 34 to the log in instruction. The central/proxy server 12 receives the presence information 34, and transmits the presence information 34 to other user devices 20 that are also logged in to the media item recommendation system 10. Additionally, the central/proxy server 12 may store the presence information 34 in the user account 14.

FIG. 1 shows the presence information 34A being transmitted from the user device 20A to the central/proxy server 12 and to the user devices 20B and 20N. Alternatively, the log in instruction with the presence information 34A may be transmitted directly from the user device 20A to the user devices 20B and 20N. Although for purposes of ease of explanation of the present invention, FIG. 1 shows the presence information 34A being transmitted from the user device 20A and received by the user devices 20B and 20N, it is understood that the user devices 20B, 20N similarly may transmit the presence information 34B, 34N, respectively, and user device 20A may receive the presence information 34B, 34N.

Figure 3:
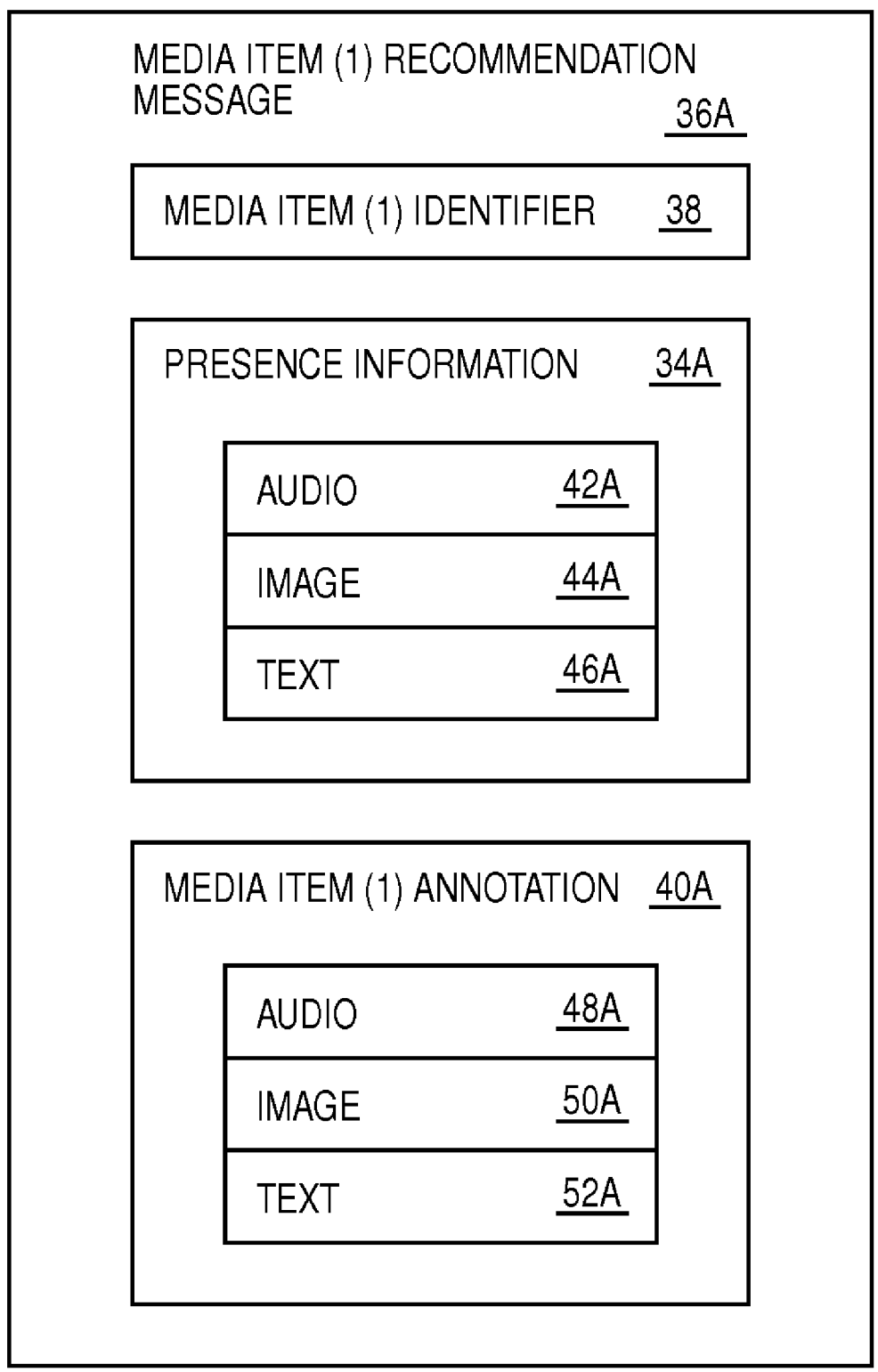
FIG. 3 is a block diagram illustrating components of an exemplary media item recommendation message according to one embodiment of the present invention.

The user device 20, and in particular the recommendation engine 24, generates a media item recommendation message 36 and transmits the media item recommendation message 36 to the central/proxy server 12. The media item recommendation message 36 includes a media item identifier 38 (FIG. 3), the presence information 34, and, optionally, a media item annotation 40 (FIG. 3). The central/proxy server 12 records the media item recommendation message 36 in the recommendation database 16. The central/proxy server 12 transmits the media item recommendation message 36 to the other user devices 20. Alternatively, the media item recommendation message 36 may be transmitted directly to the other user devices 20.

The user device 20 can be both a recommender of the media item recommendation message 36 and a recipient of the media item recommendation message 36. In other words, a user device 20 may act as a recommender by generating and transmitting a media item recommendation message 36, and a recipient by receiving a media item recommendation message 36 generated by the recommender.

Although for purposes of ease of explanation of the present invention, FIG. 1 shows the user device 20A as the recommender transmitting the media item recommendation message 36A, and the user devices 20B, 20N are the recipients of media item recommendation message 36A, the user devices 20B, 20N may also be recommenders and transmit the media item recommendation messages 36B, 36N, respectively.

Figure 2:
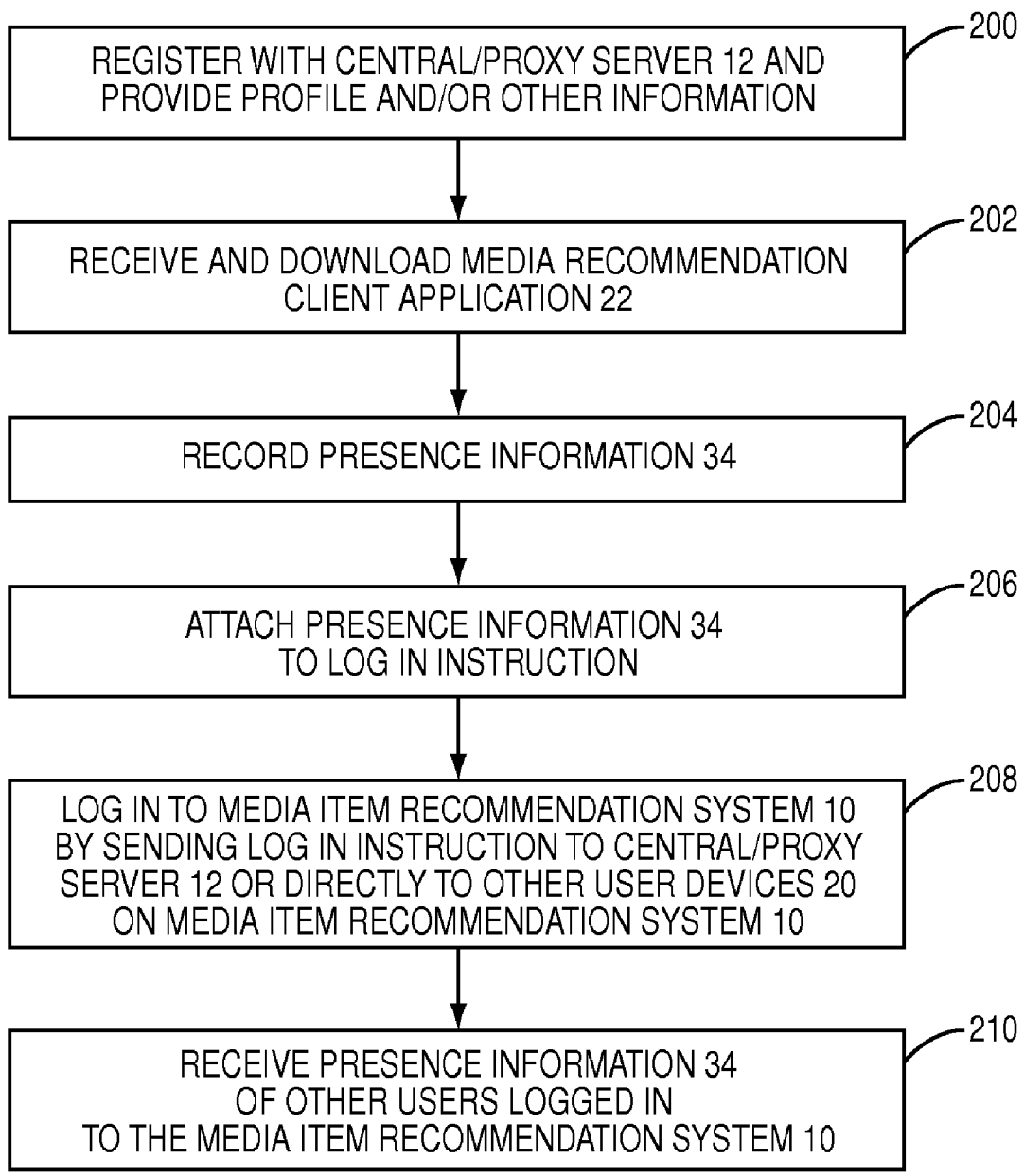
FIG. 2 is a flow chart illustrating the process of a user for registering with a media item recommendation client application and attaching presence information to a log-in instruction to the media item recommendation system according to one embodiment of the present invention.

FIG. 2 illustrates a process for the user device 20 to register with the media item recommendation client application 22 via the central/proxy server 12 and to log in to the media item recommendation system 10. This allows a user to access and to begin executing the media item recommendation client application 22. The process begins with the user device 20 registering with the central/proxy server 12 (step 200). The user device 20 may send profile and/or additional information with the registration. The user device 20 then receives the media item recommendation client application 22 from the central/proxy server 12 and downloads the media item recommendation client application 22 (step 202). Using the user device 20, the user develops presence information 34 which may be recorded in the user device 20 (step 204).

When the user desires to log in to the media item recommendation system 10, the user device 20 attaches the presence information 34 recorded by the user device 20 to a log in instruction (step 206). The user device 20 logs in to the media item recommendation system 10 by sending the log in instruction with the presence information 34 to the central/proxy server 12 (step 208). Alternatively, the user device 20 may send the log in instruction directly to the other user devices 20 on the media item recommendation system 10. The user device 20 may also receive the presence information 34 of other user devices 20 logged in to the media item recommendation system 10 (step 210). The user device 20 receives the presence information 34 of the other user devices 20 as part of a log-in notice transmitted from the central/proxy server 12 or directly from the other user devices 20.

FIG. 3 is a block diagram of the components of the media item (1) recommendation message 36A generated and transmitted by the user device 20A according to one embodiment of the present invention. FIG. 3 provides a description of the structure of the media item recommendation message 36 which may be propagated on the media item recommendation system 10 according to one embodiment of the present invention. The media item (1) recommendation message 36A includes the media item (1) identifier 38, which is used by the media item recommendation system 10 to identify the specific media item being recommended. For purposes of discussing the present invention, the media item identifier 38 is shown in FIG. 3 as "(1)" but may be any type or form of unique identifier. For example, the media item (1) identifier 38 may utilize an alphanumeric format or progression comprising and/or referring to a known fingerprint and/or Globally Unique Identifier (GUID) of the media item.

The media item (1) recommendation message 36A includes the presence information 34A and a media item (1) annotation 40A. As discussed above, the presence information 34A may be any personal, unique, novel, and/or creative tag presentation or other information the recommender desires to include with the media item recommendation message and may comprise an audio component 42A, an image component 44A, and a text component 46A. The audio component 42A may be any type of audio content, or audio tag line, whether originally developed by the recommender and provided to the user device 20A or imported by the recommender into the user device 20A from the media item recommendation system 10 or an external source. The image component 44A may be any still or graphic image, for example, a picture of the recommender. The text component 46A may be any textual message, or text tag line that the recommender desires to include in the media item (1) recommendation message 36A. The recommender for example, may provide personal information as to his or her preferences or profile as the text component 46A. The above examples of the presence information 34A should in no manner be understood as limiting the particular type of message and/or content of the presence information 34.

Similarly, the media item annotation 40A may comprise an audio component 48A, an image component 50A, and/or a text component 52A. The media item annotation 40A may contain the same type of information as the presence information 34A and may be directed more towards other personal information or content, the media item, and/or the artist. For example, the audio component 48A may be a summary portion of the recommender's favorite song and/or the media item being recommended; the image component 50A may be a picture of the recipient, friends, the artist or an album cover and/or CD jewel case insert; and the text component 52A may be a personal message, album liner notes, inserts from a CD jewel case, published reviews or other commentaries pertaining to the media item, the artist and/or other similar media items or works of the artist. The above examples of media item annotations 40A should in no manner be understood as limiting the particular type of message and/or content of the media item annotation 40.

The media item (1) recommendation message 36A also may be implemented in Extensible Markup Language (XML). The presence information 34A and the media item annotation 40A may be in metadata form. The metadata may be embedded in the XML message as data payload or, alternatively, may be pointed to by a Uniform Resource Locator (URL). Additionally, the URL may be in the form of a hyperlink to the central/proxy server 12, for example.

FIG. 4 shows the media item recommendation message 36 in which the media item identifier 38, the presence information 34, and the media item annotation 40 are illustrated with exemplary information. FIG. 4 is provided to show an example of the type of information which may be included in the media item recommendation message 36. The media item identifier 38 shows the artist of the recommended media item, "Avril Lavigne," and the title of the media item, "Girlfriend." As discussed above, the media item identifier 38 may be any type of unique identifier to identify the media item.

The presence information 34 includes the audio component 42 in the form of a summary or snippet of the song "Bust A Move." A picture of the recommender is incorporated in the presence information 34 as the image component 44. A quote provided by the recommender is incorporated as the text component 46 of the presence information 34. FIG. 4 shows how the recommender may include presence information 34 in audio, image, and textual format to provide unique, novel, and distinctive identification tags of the recommender.

The media item annotation 40 incorporates a voice recording of the recommender as the audio component 48. The voice recording provides an introductory salutation to the recipient and to introduce the image component 50. A picture of the recipient with her friends taken at an event is incorporated as the image component 50. The text component 52 provides a textual description of the image component 50. FIG. 4 shows how the recommender may include the media item annotation 40 in audio, image, and textual format to convey an additional personal message to the recipient. As such, the media item annotation 40 may be any additional information or message.

Figure 5:
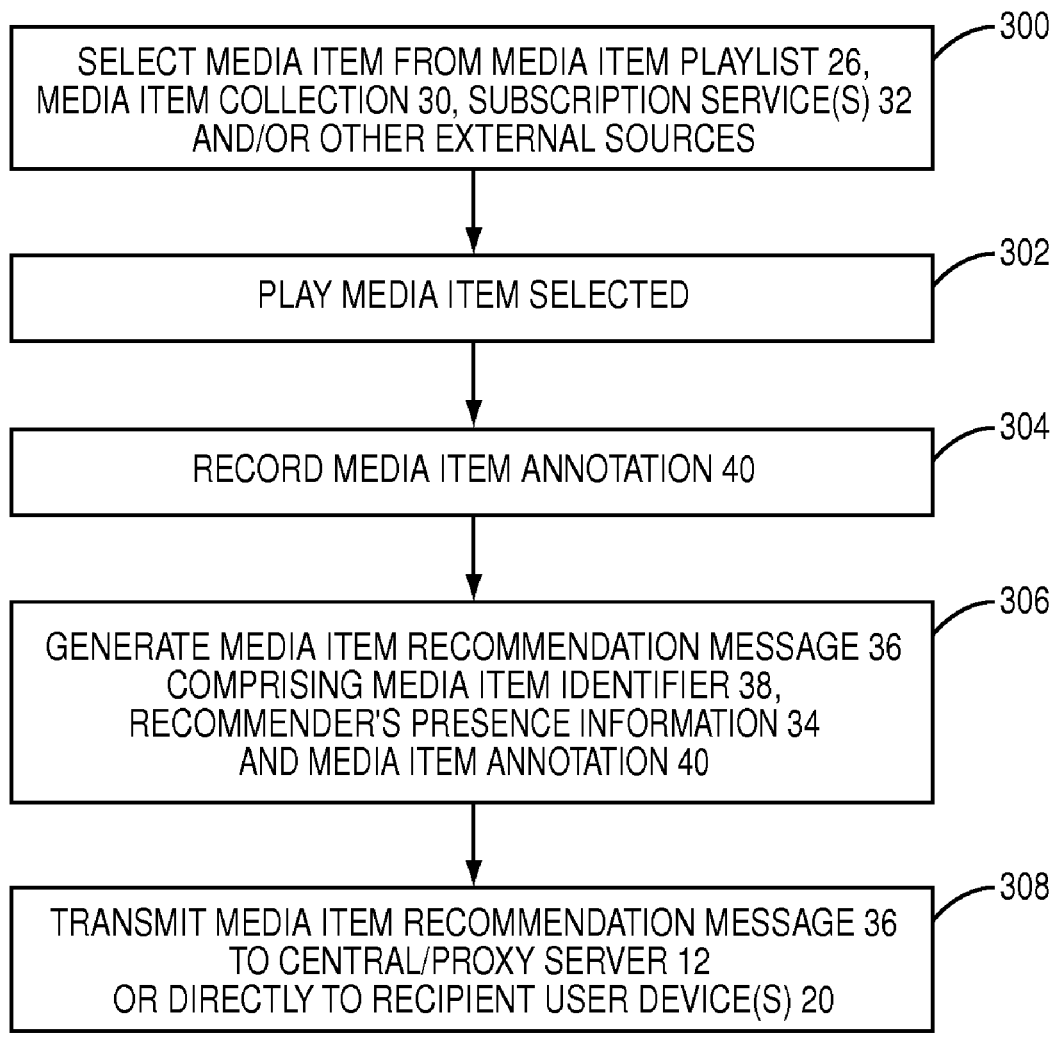
FIG. 5 is a flow chart illustrating the process for providing and transmitting the media item recommendation message when a media item recommendation is made, wherein the media item recommendation message comprises a media item identifier, a recommender's presence information, and a media item annotation according to one embodiment of the present invention.

FIG. 5 is a flow chart illustrating the process for generating and transmitting the media item recommendation message 36 according to one embodiment of the present invention. This allows a description as to how the user device 20 automatically generates and transmits a media item recommendation message 36 for a media item after the user device 20 plays the media item. The user utilizing user device 20 selects a media item to play from the media item playlist 26, the media item collection 30, the subscription service(s) 32 and/or another external source (step 300). The user device 20 plays the media item selected (step 302) and the user, utilizing the user device 20, may then record the media item annotation 40 (step 304). As discussed above, the media item annotation 40 may comprise the audio component 48, the image component 50 and/or the text component 52. Additionally, the media item annotation 40 may be original content developed by the user or may be content the user imports into the media item recommendation message 36 utilizing the user device 20, or a combination of both original and imported content.

The media item recommendation client application 22 may cause the user device 20 to automatically generate the media item recommendation message 36 when certain actions occur (step 306). One such action may be the playing of the media item on the user device 20. In such a case, the user device 20 generates the media item recommendation message 36 by including the media item identifier 38 and incorporating the presence information 34. Optionally, the user device 20 may also include the media item annotation 40 such that the media item recommendation message 36 comprises the media item identifier 38, the presence information 34 of the recommender, and the media item annotation 40, if developed and included by the recommender. The presence information 34 and, optionally, the media item annotation 40 are included in the media item recommendation message 36 in association with the media item identifier 38. In other words, the media item recommendation message 36 provides a structure for associating the presence information 34 and the media item annotation 40 with the media item identifier 38. In this manner, the presence information 34 and/or the media item annotation 40 are renderable and storable, individually, and/or in association with the media item identifier 38, and, therefore, the media item. The user device 20 then transmits the media item recommendation message 36 addressed to the recipients by sending the media item recommendation message 36 to the central/proxy server 12 or directly to the user devices 20 of the recipients of the media item recommendation message 36 (step 308). Although not shown in FIG. 5, the present invention allows the user to select the media item, for example from the media item playlist 26, record a new and/or include existing presence information 34 and/or media item annotation 40 as the user desires, and transmit a media item recommendation message 36 without having to play the media item.

Figure 6:
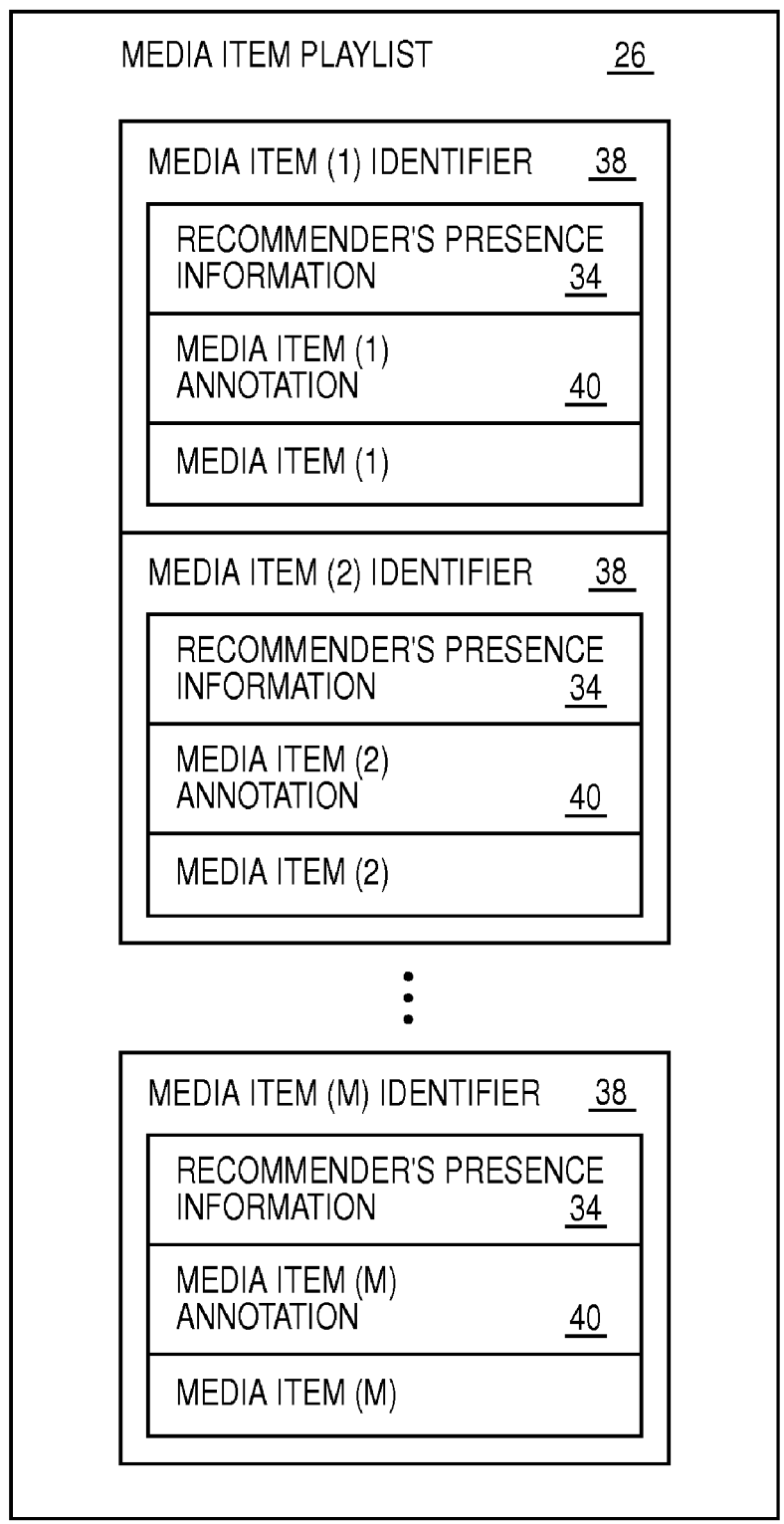
FIG. 6 is a block diagram illustrating components of an exemplary media item playlist including the presence information and the media item annotation as a result of a received media item recommendation message according to one embodiment of the present invention.

FIG. 6 is a block diagram illustrating the components of an exemplary media item playlist 26 according to one embodiment of the present invention. FIG. 6 provides a reference for the discussion of the manner in which the media item identifier 38 and the presence information 34 and media item annotation 40 are stored on a media item playlist 26. The media item playlist 26 may store the media item identifier 38 for each media item recommendation message 36 and/or for each media item in the media item collection 30. Also, the media item may be stored on the media item playlist 26. Additionally, the media item playlist 26 may store the recommender's presence information 34 and media item annotation 40 for each of the media item recommendation messages 36 received by the user device 20.

The recommender's presence information 34, the media item annotation 40, and the media item may be organized on the media item playlist 26 in such a manner that the presence information 34, the media item annotation 40, and/or the media item are associated with the media item identifier 38. As such, the media item playlist 26 provides an "enhanced" playlist. The user may select when and how to render the media item, the presence information 34, and the media item recommendation 40. The user may render, and, therefore, play the media item, display the presence information 34, and display the media item annotation 40, by selecting the media item identifier. Alternatively, the user may display the presence information 34, or display the media item annotation 40 by individually selecting the presence information 34 or the media item annotation 40, respectively. The media item playlist 26 also may be transferred to a storage medium, for example, a CD, and/or transferred to a separate portable device, for example, an MP3 player and/or a cell phone. For purposes of describing the present invention, FIG. 6 shows three media item identifiers 38 designated as (1), (2), and (M), along with the associated media items. It should be understood that the present invention should not be limited to any specific quantity of media item identifiers 38 and, therefore, media items. The designation (M) is meant to describe and convey an unlimited quantity of media item identifiers 38 and media items.

Figure 7:
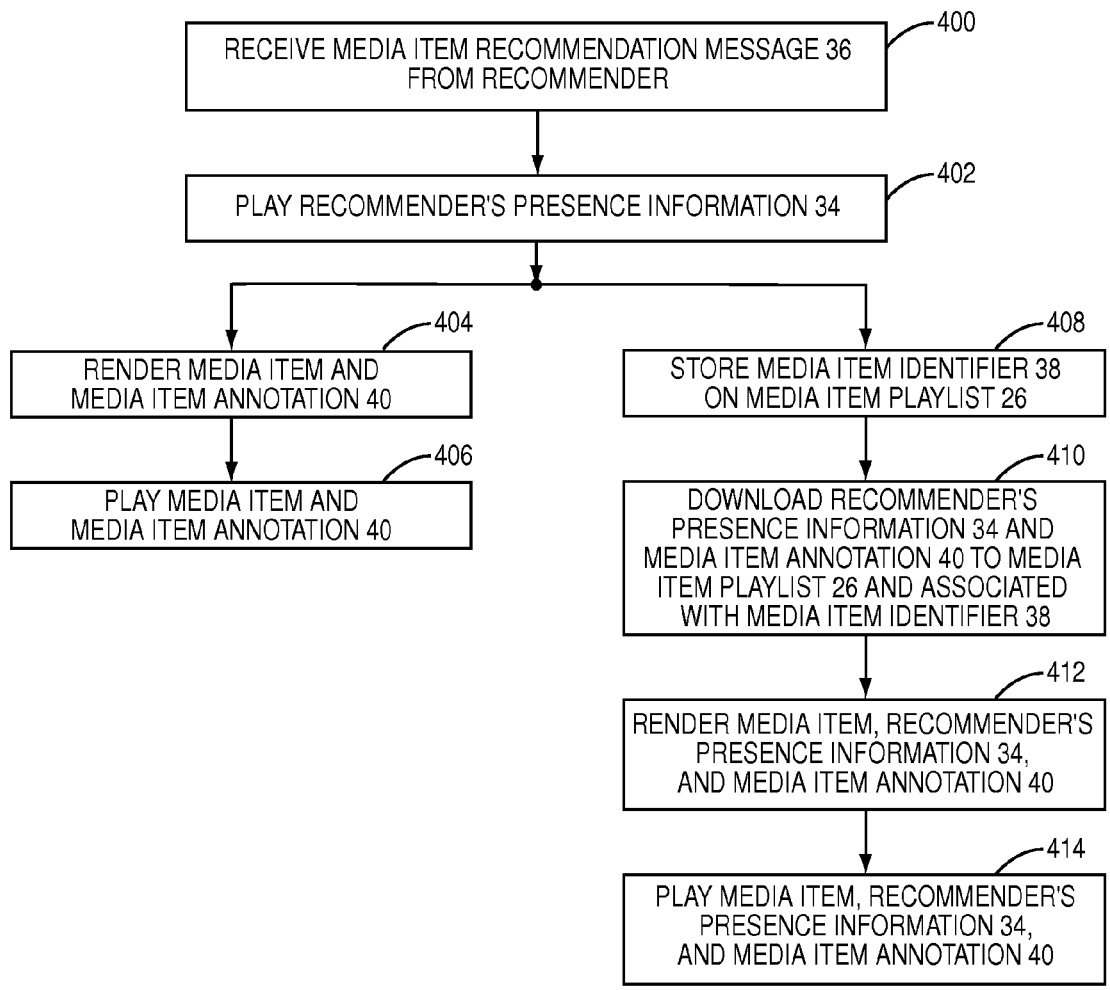
FIG. 7 is a flow chart illustrating the process for receiving the media item recommendation message, wherein a media item, the recommender's presence information, and/or the media item annotation are rendered and/or stored according to one embodiment of the present invention.

FIG. 7 is a flow chart illustrating the process for receiving a media item recommendation message 36 at the user device 20 of the recipient. This allows a description of how the user device 20 processes the media item recommendation message 36, including receiving, rendering, playing, and/or storing the presence information 34, the media item annotation 40, and the media item. The user device 20 receives the media item recommendation message 36 from the user device 20 of the recommender (step 400). Upon receiving the media item recommendation message 36, the user device 20 processes the media item recommendation message 36. The user device 20 processes the media item recommendation message 36 by playing the presence information 34 (step 402). By playing the presence information 34, the recipient may be made aware of the receipt of the media item recommendation message 36 and, if desired, may contact the recommender, for example, to discuss or inquire about the media item being recommended.

The recipient may elect to process the media item recommendation message 36 by rendering the media item that is the subject of the media item recommendation message 36, which may also render the media item annotation 40 (step 404). Rendering the media item causes the media item player 28 in the user device 20 of the recipient to play the media item and may cause the user device 20 to play the media item annotation 40 (step 406). Additionally, the user device 20 may render, and, therefore, play the presence information 34. To play the media item, the user device 20 may access the media item from the media item collection 30. If the media item is not in the media item collection 30, the user device 20 may access it from the central/proxy server 12, if the media item is stored in the central/proxy server 12. If the media item is not stored in the media item collection 30 or in the central/proxy server 12, the user device 20 may elect to acquire the media item from the subscription service 32 or another external source.

Alternatively, instead of rendering the media item upon receipt of the media item recommendation message 36, the recipient may elect to process the media item recommendation message 36 by storing the media item recommendation message on the media item playlist 26 for rendering later. In such a case, the media item identifier 38 is stored on the media item playlist 26 (step 408). The user device 20 of the recipient downloads the recommender's presence information 34 and the media item annotation 40 to the media item playlist 26 in such a manner as the recommender's presence information 34 and the media item annotation 40 may be associated with the media item identifier 38, and, thereby, the media item (step 410).

When the recipient desires to play the media item, the recipient selects the media item from the media item playlist 26. The user device 20 renders the media item, and the recommender's presence information 34 and the media item annotation 40, that were stored on the media item playlist 26 (step 412). The media item player 28 in the user device 20 plays the recommender's presence information 34, the media item annotation 40 and the media item (step 414).

When the media item recommendation message 36 is received and/or when the media item is rendered the audio 42 (FIG. 3) of the presence information 34 and the audio 48 (FIG. 3) of the media item annotation 40 may be played before, during, also referred to as "on top of," or in place or instead of the audio of the recommended media item or the media item currently being played by the user device 20 of the recipient.

As discussed above with respect to FIG. 5, the media item recommendation client application 22 may cause the user device 20 to generate and transmit a media item recommendation message 36 when a media item is played by the user device 20. As such, whether the recipient elects to render the media item upon receipt of the media item recommendation message 36 or to store the media item recommendation message in the media item playlist 26 for rendering later, the media recommendation message 36 is generated when the media item is played. In this case, the media item recommendation message 36 is generated by the user device 20 of the recipient. The recipient may retain the recommender's presence information 34 of, and the media item annotation 40 developed by, the previous recommender. Alternatively, the recipient, who now becomes the recommender, may adapt the previous recommender's presence information 34 and/or media item annotation 40. The recipient may adapt the recommender's presence information 34 by including the recommender's presence information 34 unmodified, including the recommender's presence information 34 as modified by the recipient, including the recipient's presence information 34 with the recommender's presence information 34 unmodified, replacing the recommender's presence information 34 with the recipient's presence information 34, and/or including the recommender's presence information 34 as modified by the recipient with the recipient's presence information 34. Similarly, the recipient may adapt the recommender's media item annotation 40 by including the recommender's media item annotation 40 unmodified, including the recommender's media item annotation 40 as modified by the recipient, including the recipient's media item annotation 40 with the recommender's media item annotation 40 unmodified, replacing the recommender's media item annotation 40 with the recipient's media item annotation 40, and/or including the recommender's media item annotation 40 as modified by the recipient with the recipient's media item annotation 40. In such a manner, the media item recommendation message 36 may be propagated to and among the users of the media item recommendation system 10.

Additionally, the recipient may elect to transfer the media item, the presence information 34 and/or the media item annotation 40 to a different physical storage media such as, for example, a CD. Optionally, the recipient may elect to download the media item and/or the media item playlist 26 with the presence information 34 and/or the media item annotation 40 to a separate portable device such as, for example, an MP3 player or a cell phone.

FIG. 8 is a block diagram illustrating the components of an exemplary user account 14 in the central/proxy server 12 according to one embodiment of the present invention. FIG. 8 provides an overview of the structure of the user account 14, the information recorded therein, and a reference for describing the interaction between the central/proxy server 12 and the user devices 20. FIG. 8 shows the user account 14A, but should be understood that the user account 14A may be typical for all users subscribed to the media item recommendation client application 22. In one embodiment of the present invention, the user account 14A may be stored on the central/proxy server 12. The user account 14A may store a record of certain information concerning the user, the user's media item collection, and the user's activities involving media items.

The user account 14A may have a record as to whether that user device 20A is able to communicate with the media item recommendation system 10 by on-line status 54A. The central/proxy server 12 may refer to the on-line status 54A to determine if the log-in notice with the presence information 34 and/or the media item recommendation message 36 may be transmitted to the user device 20A. The user account 14A may also record the presence information 34A and the media item annotation 40A transmitted by the user device 20A.

The user account 14A may also contain a friends list 56A and group list 58A. The friends list 56A is a list of the other users registered on the media item recommendation system 10 from whom the user desires to receive media item recommendation messages 36. The user may not want to receive media item recommendation messages 36 from all of the subscribers to the media item recommendation client application 22. The group list 58A may be used by the user to group the friends recorded in the friends list 56A into different groups to further control the transmission and receipt of the media item recommendation message 36 from another user. For example, although user 'B' and user 'C' may be on the friends list 56A, they may be in two separate groups in the group list 58A. The user may desire to receive the media item recommendation message 36 from a friend in a certain group only if it is a certain genre, for example.

The user account 14A also records the user's play history 60A. The user's play history 60A is a time-stamped record of each media item played by the user. The user account 14A also may contain information regarding the user's particular media preferences 62A. The user's media preferences 62A may relate to the different likes and dislikes of the user based on certain identified media categories. The media categories, for example, may be genre, artist, date of release of the media item, and other information. Also, the user account 14A may have a record of the user's media item collection 30A, profile 64A information provided by the user, and any subscriptions 66A the user may have with subscription service(s) 32. Additionally, the preferences 62A, media item collection 30A, play history 60A, and other information provided by the user at the time of registering with the media item recommendation client application 22 may be used to further develop and update the profile 64A of the user. Additionally, the profile 64A may include a statistical compilation of the aforementioned information.

FIG. 9 is a block diagram illustrating the components of an exemplary recommendation database 16 in the central/proxy server 12 according to one embodiment of the present invention. FIG. 9 provides an overview of the structure of the recommendation database 16, the information recorded therein, and a reference for describing the interaction between the central/proxy server 12 and the user devices 20. The recommendation database 16 may store and keep a record of the media item recommendation messages 36 provided on the media item recommendation system 10. In FIG. 9, a record of the media item (1) recommendation message 36A is shown. The identity of the recommender may be recorded by designating the user device 20A from which the central/proxy server 12 received the media item (1) recommendation message 36A. The media item (1) identifier 38 is recorded. A running total 70 of the media item recommendation messages 36A for the media item (1) is recorded, as is a total 72A of media item (1) recommendation messages 36A for the recommender.

Additionally, the recommender's presence information 34A and the media item annotation 40A for the media item (1) recommendation message 36A may be recorded and stored. The media item score 76 also may be recorded. The media item score 76 may be based on the number of media item recommendation messages 36 for the media item (1) adjusted appropriately for multiple recommendations from the same recommender as may be recorded by the total 72A for the recommender. The recommendation database 16 may also record the total number 74 of recipients that received the media item (1) recommendation message.

Figure 10:
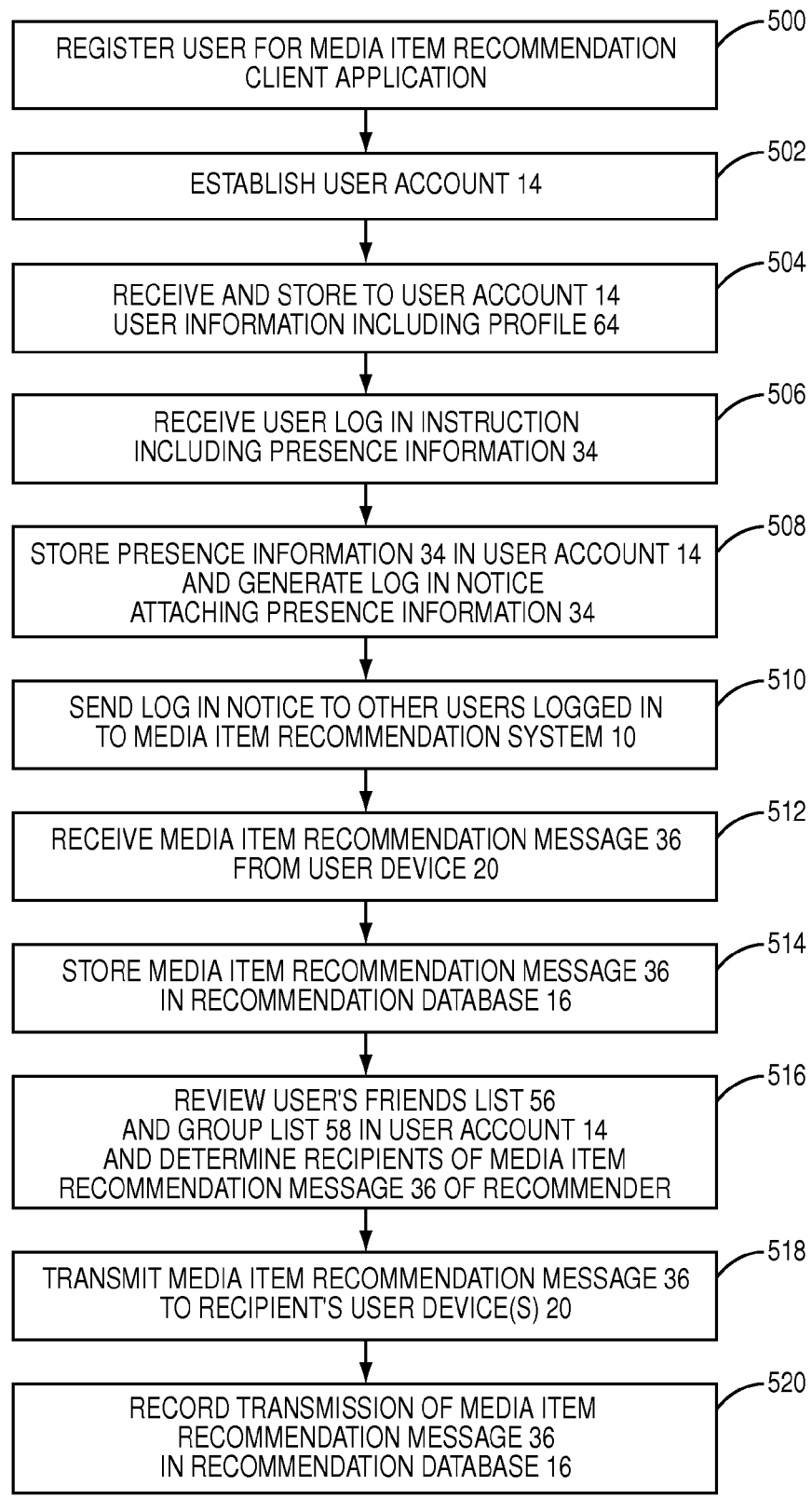
FIG. 10 is a flow chart illustrating the process for the central/proxy server to receive the log in instructions and the media item recommendation from a recommender, and transmit a log-in notice and the media item recommendation message to a recipient according to one embodiment of the present invention.

FIG. 10 is a flow chart illustrating the process for the central/proxy server 12 to receive the log in instructions and the media item recommendation message 36 from a recommender, and to transmit a log-in notice and the media item recommendation message 36 to the recipient according to one embodiment of the present invention. The central/proxy server 12 receives information from the user device 20, registers the user for the media item recommendation client application 22, and establishes the user account 14 for the user (steps 500, 502). The profile 64 and other information received by the central/proxy server 12 may be stored in the user account 14 (step 504). When the user logs in to the media item recommendation system 10, the central/proxy server 12 receives the log in instruction including the presence information 34 from the user device 20 (step 506). The central/proxy server 12 stores the presence information 34 in the user account 14 and generates the log-in notice attaching the presence information 34 (step 508). The central/proxy server 12 refers to the on-line status 54 of the user accounts 14 to determine which of the other user devices 20 of the media item recommendation client application 22 are logged in to the media item recommendation system 10. The central/proxy server 12 sends the log-in notice with the attached presence information 34 to the other user devices 20 that are logged in (step 510).

The central/proxy server 12 may receive the media item recommendation message 36 from the user device 20 of the logged in user (step 512). The central/proxy server 12 may store and keep a record of the media item recommendation message 36 in the recommendation database 16 (step 514). Storing the media item recommendation message 36 includes storing the presence information 34 and/or the media item annotation 40. Alternatively, the presence information 34 and/or the media item annotation 40 may be stored separately from the media item recommendation message 36. The central/proxy server 12 reviews the friends list 56 and group list 58 of the user accounts 14 to determine to which recipient user(s) to transmit the media item recommendation message 36 (step 516). The central/proxy server 12 transmits the media item recommendation message 36 to the appropriate user devices 20 of the recipients (step 518) and records the transmission in the recommendation database 16 (step 520).

FIG. 11 is the user-server media item recommendation system 10 of FIG. 1 further illustrating in more detail the provisioning and propagation of the media item recommendation message 36 among the user devices 20 of the media item recommendation system 10 according to one embodiment of the present invention. FIG. 11 shows the user devices 20A, 20B, 20N and provides a reference for the discussion of FIGS. 12A, 12B and 12C. The presence information 34A, 34B, 34N and the media item (1) recommendation message 36A, 36B, 36N are transmitted and received according to one embodiment of the present invention, the process of which is described in detail with respect to FIGS. 12A, 12B and 12C, below.

FIGS. 12A, 12B, and 12C illustrate an exemplary communication flow diagram between the central/proxy server 12 and the user devices 20A, 20B, 20N. FIGS. 12A, 12B, and 12C describe and discuss how the media item (1) recommendation message 36 is propagated among the users of the media item recommendation system 10. Referring to FIG. 12A, the user device 20A generates the media item (1) recommendation message 36A (step 600) and transmits the media item (1) recommendation message 36A to the central/proxy server 12 (step 602). The central/proxy server 12 receives the media item (1) recommendation message 36A, stores the media item (1) recommendation message 36A in the recommendation database 16 (step 604) and reviews the friends list 56 and the group lists 58 in the user accounts 14 to determine to which user devices 20 to transmit the media item (1) recommendation message 36A (step 606). The central/proxy server 12 determines that the user devices 20B, 20N may appropriately receive the media item (1) recommendation message 36A and sends the media item (1) recommendation message 36A to the user device 20B (step 608) and the user device 20N (step 610).

The user devices 20B, 20N play the presence information 34A included in the media item (1) recommendation message 36A (steps 612 and 614). The user of the user device 20N elects to not play the media item but, instead to store the media item (1) recommendation on the media item playlist 26N for rendering at a subsequent time. The user device 20N stores the media item (1) identifier 38 on the media item playlist 26N and downloads the presence information 34A and the media item annotation 40A, if present, to the media item playlist 26N to store the presence information 34A and the media item annotation 40A on the media item playlist 26N (step 616). The user of the user device 20B elects to play the media item (1) and the user device 20B renders the media item (1) and the media item annotation 40A, if present (step 618). The presence information 34A may also be rendered when the user device 20B renders the media item (1). The media item player 28B plays the media item (1), and may play the presence information 34A and the media item annotation 40A (not shown). Optionally, the user of the user device 20B may elect not to play the presence information 34A and/or the media item annotation 40A when rendering the media item (1).

Referring to FIG. 12B, the user of the user device 20B decides to record a media item (1) annotation 40B for the media item (1) to include with, modify or replace the media item (1) annotation 40A transmitted with the media item (1) recommendation message 36A (step 620). Because the user device 20B played the media item (1), the user device 20B automatically generates the media item (1) recommendation message 36B, including the media item (1) identifier 38, the presence information 34B, and the media item (1) annotation 40B (step 622). As such, the media item (1) recommendation message 36B may include the presence information 34 and/or media item annotation 40 of one or more of a plurality of recommenders. The user of the user device 20B may adapt the presence information 34A by replacing the presence information 34A with the presence information 34B, or incorporating the presence information 34B with the presence information 34A, modified or unmodified, into the media item (1) recommendation message 36B. Alternatively, the user of the user device 20B may elect to not include the presence information 34B in the media item (1) recommendation message 36B. In such a case, the user of the user device 20B may elect to retain as received or modify the presence information 34A in the media item (1) recommendation message 36B.

The user device 20B transmits the media item (1) recommendation message 36B to the central/proxy server 12 (step 624). The central/proxy server 12 receives the media item (1) recommendation message 36A, stores the media item (1) recommendation message 36B in the recommendation database 16 (step 626) and reviews the friends list 56 and the group list 58 in the user accounts 14 to determine to which of the user devices 20 to transmit the media item (1) recommendation message 36B (step 628). The central/proxy server 12 determines that the user devices 20A, 20N may appropriately receive the media item (1) recommendation message 36B and sends the media item (1) recommendation message 36B to the user device 20A (step 630) and the user device 20N (step 632).

The user devices 20A, 20N play the presence information 34B included in the media item (1) recommendation message 36B (steps 634 and 636). Because the user of the user device 20A was the initial recommender of the media item (1), the user of the user device 20A elects to not play the media item (1) but instead stores the media item (1) recommendation on the media item playlist 26A for rendering at a subsequent time. The user device 20A stores the media item (1) identifier 38 on the media item playlist 26A and downloads the presence information 34B and the media item annotation 40B, if present, to the media item playlist 26A (step 638).

The media item (1) recommendation message 36B is a subsequent recommendation of the media item (1) received by the user of the user device 20N. As such, the media item (1) identifier 38 is already stored on the media item playlist 26N. The user device 20N updates the media item playlist 26N. The update to the media item playlist 26N may include an update of the score for media item (1) based on the subsequent recommendation. The user device 20N also downloads the presence information 34B and the media item (1) annotation 40B to the media item playlist 26N to store the presence information 34B and the media item annotation 40B on the media item playlist 26N (step 640). The user of the user device 20N may decide to play the media item (1). The user device 20N renders the media item (1) and the media item (1) annotation 40B from the media item playlist 26N (step 642). Optionally, when rendering the media item (1), the user of user device 20N may elect to also render the presence information 34A, the presence information 34B, and/or the media item (1) annotation 40A, which may continue to be stored on the media item playlist 26N. In addition, the user of the user device 20N may render and/or play the presence information 34A, the presence information 34B, the media item annotation 40A, and/or the media item annotation 40B on the user device 20N without rendering the media item (1).

Referring to FIG. 12C, the user of the user device 20N decides to record the media item (1) annotation 40N for the media item (1) to include with, modify or replace one or both of the media item (1) annotations 40A, 40B transmitted with the media item (1) recommendation messages 36A, 36B (step 644). Because the user device 20N played the media item (1), the user device 20N automatically generates the media item (1) recommendation message 36N, includes the media item (1) identifier 38, and may include the presence information 34N and the media item (1) annotation 40N (step 646). As such, the media item (1) recommendation message 36B may include the presence information 34 and/or media item annotation 40 of one or more of a plurality of recommenders.

The user of the user device 20N may adapt the presence information 34A and/or the presence information 34B by replacing the presence information 34A and/or the presence information 34B with the presence information 34N, and/or incorporating the presence information 34N with presence information 34A and/or the presence information 34 B into the media item (1) recommendation message 36N. Alternatively, the user of the user device 20N may elect to not include the presence information 34N in the media item (1) recommendation message 36N. In any such case, the user of the user device 20N may elect to retain as received or modify the presence information 34A and/or presence information 34B in the media item (1) recommendation message 36N.

The user device 20N transmits the media item (1) recommendation message 36N to the central/proxy server 12 (step 648). The central/proxy server 12 receives the media item (1) recommendation message 36N, stores the media item (1) recommendation message 36N in the recommendation database 16 (step 650) and reviews the friends list 56 and the group list 58 in the user accounts 14 to determine to which of the user devices 20 to transmit the media item (1) recommendation message 36N (step 652). The central/proxy server 12 determines that the user devices 20A, 20B may appropriately receive the media item (1) recommendation message 36N and sends the media item (1) recommendation message 36N to the user device 20A (step 654) and the user device 20B (step 656).

The user devices 20A, 20B play the presence information 34N included in the media item (1) recommendation message 36N (steps 658 and 660). Because the media item (1) recommendation message 36N is a subsequent recommendation of the media item (1) received by the users of the user devices 20A, 20B, the media item (1) identifier 38 is already stored on the media item playlists 26A, 26B. The user devices 20A, 20B update the media item playlists 26A, 26B. The update to the media item playlists 26A, 26B may include an update of the score for the media item (1) based on the subsequent recommendations. The user devices 20A, 20B download the presence information 34N and the media item annotation 40N, if present, to the media item playlists 26A, 26B to store the presence information 34N and the media item annotation 40N on the media item playlists 26A, 26B (steps 662 and 664).

Instead of playing the media item (1), the user of the user device 20A elects to store the media item (1) to a storage medium, for example, by burning a CD of the media item (1) with the media item (1) annotation 40N (step 666). Optionally, the user of the user device 20A may elect to burn the CD of the media item (1) and include the media item (1) annotation 40A and/or 40B, or any combination of the media item (1) annotations 40A, 40B, 40N. The presence information 34A, 34B, 34C may also be burned to the CD with the media item (1). As such, the user of the user device 20A may transfer all or a portion of the media item playlist 26A to a storage medium such as a CD. The user of the user device 20A may play the media item (1), the presence information 34, and the media item (1) annotations 40 at any time by playing the CD.

The user of the user device 20B may elect to download the media item (1), the presence information 34N, and the media item (1) annotation 40N to a separate portable device for playing at a subsequent time (step 668). Optionally, the user of the user device 20B also may elect to download the presence information 34A, 34B and the media item (1) annotation 40A and/or 40B, or any combination thereof. Also, the user of the user device 20B may download to the separate portable device all or a portion of the media item playlist 26B. The user of the user device 20B may play the media item (1), any of the presence information 34, and the media item (1) annotations 40 without having to be connected to the media item recommendation system 10.

FIG. 13 shows the media item recommendation message 36 of FIG. 4 with additional detail. FIG. 13 is provided to show an example of the type of information which may be included in the media item recommendation message 36 as the media item recommendation message 36 is propagated on the media item recommendation system 10 (FIG. 11). FIG. 13 shows the media item (1) recommendation message 36B of the user of the user device 20B (FIG. 11). The media item (1) recommendation message 36B includes the media item identifier 38, and includes the presence information 34B with the audio component 42B, the image component 44B, and the text component 46B. Additionally, the media item (1) recommendation message 36B includes the media item annotation 40B with the audio component 48B, the image component 50B, and the text component 52B.

The media item (1) recommendation message 36B also includes presence information 34A. The incorporation of presence information 34A in the media item (1) recommendation message 36B indicates that the media item (1) recommendation message 36 was previously sent from the user device 20A (FIG. 11). The user of user device 20B has decided to adapt the presence information 34 by retaining the presence information 34A, unmodified, and incorporating the presence information 34B in the media item (1) recommendation message 36B. The recipient of the media item (1) recommendation message 36B will then receive the presence information 34A of the user of user device 20A and the presence information 34B of the user of user device 20B. In this manner, the media item (1) recommendation message 36 may be propagated.

Additionally, the presence information 34A is shown as an exemplary URL instead of one or more of the audio component 42A, image component 44A, and text component 46A being embedded in the media item (1) recommendation message 36B. The presence information 34A in the media item (1) recommendation message 36B includes a unique identifier in the form of "presinfo34A," which is included in the URL. A user identifier in the form of "usera" is also included in the URL. The URL may be used to access the presence information 34A in the user account for the user of the user device 20A in the central/proxy server 12. Additionally, the URL may be in the form of a hyperlink. Although not shown in FIG. 13, the media item annotation 40 may also include the media item annotation 40A of the user of user device 20A. The URL and the identifiers included in the presence information 34A are for explanatory purposes only. Accordingly, the present invention should not be understood to be limited to any particular type of form of URL and/or identifiers.

FIG. 14 illustrates an exemplary graphical user interface (GUI) 78 on the user device 20. The GUI 78 is a presence information preferences setting screen allowing the user of the user device 20 to provide presence information preferences. The GUI 78 comprises an insert presence information section 80. Using the GUI 78, the user of the user device 20 may provide directions as to when to insert the presence information 34 in the outgoing media item recommendation messages. The insert preference information section 80 may include selectors in the form of radio buttons 82, 84, 86 to allow the user of the user device 20 to select when to include the user's presence information 34 in a media item recommendation message 36. The user of the user device 20 may direct that the user's presence information 34 be inserted "Always" 82, "Only When Media Item Recommendation Message Does Not Already Contain Previous Recommender's Presence Information" 84, or "Never" 86.

The GUI 78 also comprises a render presence information section 88 to allow the user of the user device 20 to provide direction as to when to render the presence information of others. Selectors in the form of radio buttons 90, 92, 94, and 96 allow the user of the user device 20 to select when the user device 20 may render the presence information 34. The user of the user device 20 may direct that the presence information 34 of others be rendered "When Friends Log In" 90, "When Friends Log Out" 92, "When Media Item Recommendation Message Is Received From Friend" 94, or "When Rendering Media Item From Media Item Playlist" 96.

The GUI 78 may also comprise a presence information setting section 98 to allow the user to set the components of the presence information 34. The GUI 78 may include selectors which may comprise an audio component selector 100, an image component selector 102, and a text component selector 104. The user's presence information 34 may be set using the audio component selector 100, the image component selector 102, and the text component selector 104. The audio component selector 100 allows the user of the user device 20 to provide original audio content and/or import audio from an external source. The image component selector 102 allows the user of the user device 20 to provide any still image or graphic such as, for example, a picture of the user. The text component selector 104 allows the user of the user device 20 to provide any textual message such as, for example a personal greeting.

FIG. 15 illustrates an exemplary GUI 106 on the user device 20. The GUI 106 is an annotation information setting screen allowing the user of the user device 20 to provide direction as to when to render the media item annotation 40 and include the media item annotation 40 in a media item recommendation message 36. The user of the user device 20 may elect to "Render Annotation Information" by actuating selector 108. The user of the user device 20, using radio buttons 112, 114 and 116, may direct when the media item annotation 40 is rendered 110. The user of the user device 20 may direct that the media item annotation 40 be rendered "Prior To Playing Media Item" 112, "Over the Beginning Of Media Item" 114, or "Never" 116.

The GUI 106 also allows the user of the user device 20 to direct that the user's presence information 34 be included in place of the media item annotation 40 when no media item annotation 40 is included with the media item recommendation message 36 by actuating selector 120.

The GUI 106 may also include an annotation setting section 120 to allow the user of the user device 20 to set the components of the media item annotation 40. The GUI 106 may include selectors which may comprise an audio component selector 122, an image component selector 124, and a text component selector 126. The media item annotation 40 may be set using the audio component selector 122, the image component selector 124, and the text component selector 126. The audio component selector 122 allows the user of the user device 20 to provide audio content such as, for example, a portion of the media item. The image component selector 124 allows the user of the user device 20 to provide any still image or graphic such as, for example, a picture of the artist. The text component selector 126 allows the user of the user device 20 to provide any textual message such as, for example, critical reviews of the media item.

FIG. 16 is a block diagram illustrating more detail of the components of the presence information 34 in the user device 20 according to one embodiment of the present invention. This allows a reference for describing in more detail the structure and processing of the presence information 34 and the interaction with the media item player 28 of another user device 20. While FIG. 16 shows the user device 20A and the presence information 34A, it should be understood that FIG. 16 may apply to the other user devices 20, and, therefore, the present invention should not be limited to user device 20A.

The audio component 42A of the presence information 34A may contain one or more announcement tracks 128 (1), 128 (2), and 128 (M). Although for purposes of discussing the present invention, FIG. 16 shows three announcement tracks 128A, the present invention may not be limited to three announcement tracks 128A. The announcement tracks 128A may each have different musical backgrounds stored and associated with the announcement tracks 128A as metadata 130A. The announcement track 128A (1) may have the metadata 130A (1), the announcement track 128A (2) may have the metadata 130A (2), and the announcement track 128A (M) may have the metadata 130A (M). When the announcement track 128A is played by the user device 20 of the recipient, the musical background associated with the announcement track 128A may also play.

Each announcement track 128A may have different characteristics associated with it. The presence information 34A, therefore, may have different characteristics. These characteristics may be, for example, tempo, genre, artist, and album. The characteristics may be set by the user of the user device 20A and/or may be programmatically determined from the users profile including his or her media item collection 30 and play history.

FIG. 17 is a block diagram illustrating components of an exemplary media item player 28 in the user device 20 according to one embodiment of the present invention. FIG. 17 provides a reference for describing the interaction between a media item player 28B of the user device 20B and the presence information 34A structure of the user device 20B. While FIG. 17 shows the user device 20B and the media item player 28B, it should be understood that FIG. 17 may apply to the other user devices 20, and, therefore, the present invention should not be limited to user device 20B. FIG. 17 shows the media item player 28B currently playing the media item 132.

The currently playing media item 132 may have audio 134 which may be represented by associated metadata 136. The user device 20B may also include a media item analysis system 138B, which may analyze and compare the metadata of different media items.

The comparison performed by the media item analysis system 138B may include measuring and matching the characteristics of the media items. The media item analysis system 138B may be a program, algorithm, or control mechanism that analyzes and compares the characteristics. In addition to analyzing and comparing the characteristics, the media item analysis system 138B may include the ability to adjust the tempo or beats per minute (BPM) of the media item 132 by applying beat matching techniques. Beat matching techniques provide the ability to modify the media item using certain techniques including, but not limited to, time-stretching effects and alignment so that the announcement track 128A and media item play together in a more seamless fashion.

FIG. 18 illustrates an exemplary communication flow diagram between the central/proxy server 12 and the user devices 20A, 20B according to one embodiment of the present invention. The user device 20A generates the media item recommendation message 36A (step 700) and transmits the media item recommendation message 36A to the central/proxy server 12 (step 702). The central/proxy server 12 transmits the media item recommendation message 36A to the user device 12B (step 704).

Using the media item analysis system 138B, the user device 20B compares the metadata 136 of the currently playing media item 132 on the user device 20B with the metadata 130A of the announcement tracks 128A included in the presence information 34A (step 706). Based on the comparison, the user device 20B selects the "best fit" announcement track 128A (step 708). The user device 20B plays the "best fit" announcement track 128A from the presence information 34A (step 710).

If one of the announcement tracks 128A of the presence information 34A does not identically match the currently playing media item 132 on the user device 20B, the media item analysis system 138B may adjust the tempo of the announcement track 128A that is the closest match to the currently playing media item 132 using beat-matching techniques. In this manner, the BPM of the announcement track 128A is adjusted to match the BPM of the currently playing media item 132.

FIG. 19 is a block diagram illustrating more detail regarding the exemplary components that may be provided by central/proxy server 12 of FIGS. 1 and 10 to perform the present invention. In general, the central/proxy server 12 may be processor or microprocessor-based and also include a control system 140 having associated memory 142. The recommendation database 16 is at least partially implemented in software and stored in the memory 142. The central/proxy server 12 also includes a storage unit 144 operating to store the user accounts 14. The storage unit 144 may also store the recommendation database 16. The storage unit 144 may be any number of digital storage devices such as, for example, one or more hard-disc drives, one or more memory cards, Random Access Memory (RAM), one or more external digital storage devices, or the like. The user accounts 14 may alternately be stored in the memory 142. A communication interface 146 may include a network interface allowing the central/proxy server 12 to be communicably coupled to the network 18 (FIGS. 1 and 10).

FIG. 20 is a block diagram illustrating more detail regarding the exemplary components that may be provided within the user device 20 of FIGS. 1 and 10 to provide the present invention. In general, the user device 20 may be processor or microprocessor-based and also include a user interface 148, which may include components such as a display, speakers, a user input device, and the like. The user device 20 also includes a control system 150 having associated memory 152. In this example, the recommendation engine 24 and the media item player 28 are at least partially implemented in software and stored in the memory 152. The media item recommendation client application 22 (FIGS. 1 and 10) may also be stored in the memory 152. The user device 20 also includes a storage unit 154 operating to store the media item playlist 26 and the media item collection 30 (FIGS. 1 and 10). The storage unit 154 may be any number of digital storage devices such as, for example, one or more hard-disc drives, one or more memory cards, RAM, one or more external digital storage devices, or the like. The media item playlist 26 and the media item collection 30 may alternatively be stored in the memory 152. The user device 20 also includes a communication interface 156. The communication interface 156 may include a network interface communicatively coupling the user device 20 to the network 18 (FIGS. 1 and 10).

The functionality of the present invention can be embodied in any computer-readable medium for use by or in connection with a computer-related system or method. In the context of the present invention, a computer-readable medium is an electronic, magnetic, optical, semiconductor, or other device or means that can transmit, contain, or store a computer program, instructions or data for use by or in connection with a computer-related system or method.

Those skilled in the art will recognize improvements and modifications to the preferred embodiments of the present invention. All such improvements and modifications are considered within the scope of the concepts disclosed herein and the claims that follow.

What is claimed is:

1. A method of generating a media item recommendation message via a computing device, comprising the steps of:
   including, via the computing device, a media item identifier of a media item in a media item recommendation message, wherein the media item is audio or video; and
   including presence information of a recommender of the media item in the media item recommendation message, the presence information comprising a plurality of announcement tracks each having associated metadata of the announcement track and the media item recommendation message being constructed such that at least one of the plurality of announcement tracks is selected and played when the media item is played back at a user device receiving the recommendation message, wherein the at least one of the plurality of announcement tracks is selected using a best fit analysis based on comparing the associated metadata of the announcement track and metadata of the media item played back at the user device.

2. The method of claim 1, wherein the generating of the media item recommendation message is triggered by a playing of the media item.

3. The method of claim 1, wherein the generating of the media item recommendation message is triggered in response to receiving user input from the computing device.

4. The method of claim 1, further comprising including annotation information in the media item recommendation message, wherein the annotation information is obtained from a previously received media item recommendation message.

5. The method of claim 1, further comprising including annotation information in the media item recommendation message, wherein the annotation information is obtained as user input from the computing device.

6. The method of claim 1, wherein including the presence information comprises appending the presence information to a previously received media item recommendation message from another recommender of the media item.

7. The method of claim 1, further comprising including annotation information in the media item recommendation message, wherein including the annotation information comprises appending the annotation information to a previously received media item recommendation message.

8. The method of claim 1 wherein the recommender is associated with the computing device.

9. The method of claim 1, wherein the at least one of the plurality of announcement tracks are identified with the recommender such that playing the at least one of the plurality of announcement tracks announces that the recommender recommended the media item.

10. The method of claim 1, wherein each of the plurality of announcement tracks includes metadata describing at least one musical characteristic of the plurality of announcement tracks.

11. The method of claim 1, wherein the recommender includes a current recommender, and the presence information includes presence information of the current recommender.

12. The method of claim 11, wherein the recommender further includes a previous recommender of the media item to the current recommender in a previously received media item recommendation message by the current recommender, and the presence information further includes presence information of the previous recommender.

13. The method of claim 1, wherein the recommender is a previous recommender of the media item to a current recommender in a previously received media item recommendation message by the current recommender, and the presence information includes presence information of the previous recommender.

14. A non-transitory computer-readable medium storing instructions for generating a media item recommendation message by instructing a computing device to:
   include a media item identifier of a media item in a media item recommendation message, wherein the media item is audio or video; and
   include presence information of a recommender of the media item in the media item recommendation message, the presence information comprising a plurality of announcement tracks each having associated metadata of the announcement track and the media item recommendation message being constructed such that at least one of the plurality of announcement tracks is selected and played when the media item is played back at a user device receiving the recommendation message, wherein the at least one of the plurality of announcement tracks is selected using a best fit analysis based on comparing the associated metadata of the announcement track and metadata of the media item played back at the user device.

15. The non-transitory computer-readable medium of claim 14, wherein the generating of the media item recommendation message is triggered by a playing of the media item.

16. The non-transitory computer-readable medium of claim 14, wherein the generating of the media item recommendation message is triggered in response to receiving user input from the computing device.

17. The non-transitory computer-readable medium of claim 14, further instructing the computing device to include annotation information in the media item recommendation message, wherein the annotation information is obtained from a previously received media item recommendation message.

18. The non-transitory computer-readable medium of claim 14, further instructing the computing device to include annotation information in the media item recommendation message, wherein the annotation information is obtained as user input from the computing device.

19. The non-transitory computer-readable medium of claim 14, wherein including the presence information further comprises instructing the computing device to append the presence information to a previously received media item recommendation message from another recommender of the media item.

20. The non-transitory computer-readable medium of claim 14, further instructing the computing device to include annotation information in the media item recommendation message, wherein including the annotation information further comprises instructing the computing device to append the annotation information to a previously received media item recommendation message.

21. The non-transitory computer-readable medium of claim 14 wherein the recommender is associated with the computing device.

22. The non-transitory computer-readable medium of claim 14, wherein the plurality of announcement tracks are identified with the recommender such that playing the at least one of the plurality of announcement tracks announces that the recommender recommended the media item.

23. The non-transitory computer-readable medium of claim 14, wherein each of the plurality of announcement tracks includes metadata describing at least one musical characteristic of the plurality of announcement tracks.

24. The non-transitory computer-readable medium of claim 14, wherein the recommender includes a current recommender, and the presence information includes presence information of the current recommender.

25. The non-transitory computer-readable medium of claim 24, wherein the recommender further includes a previous recommender of the media item to the current recommender in a previously received media item recommendation message by the current recommender, and the presence information further includes presence information of the previous recommender.

26. The non-transitory computer-readable medium of claim 14, wherein the recommender is a previous recommender of the media item to a current recommender in a previously received media item recommendation message by the current recommender, and the presence information includes presence information of the previous recommender.

\* \* \* \* \*